US011888581B2

(12) United States Patent
Harada et al.

(10) Patent No.: US 11,888,581 B2
(45) Date of Patent: Jan. 30, 2024

(54) WAVELENGTH MULTIPLEXING COMMUNICATION SYSTEM AND WAVELENGTH MULTIPLEXING COMMUNICATION METHOD

(71) Applicant: NIPPON TELEGRAPH AND TELEPHONE CORPORATION, Tokyo (JP)

(72) Inventors: Rintaro Harada, Musashino (JP); Hirotaka Ujikawa, Musashino (JP); Shin Kaneko, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/908,223

(22) PCT Filed: Mar. 2, 2020

(86) PCT No.: PCT/JP2020/008619
§ 371 (c)(1),
(2) Date: Aug. 30, 2022

(87) PCT Pub. No.: WO2021/176497
PCT Pub. Date: Sep. 10, 2021

(65) Prior Publication Data
US 2023/0155712 A1    May 18, 2023

(51) Int. Cl.
*H04J 14/02* (2006.01)
*H04B 10/272* (2013.01)
*H04J 14/08* (2006.01)

(52) U.S. Cl.
CPC ........ *H04J 14/0206* (2013.01); *H04B 10/272* (2013.01); *H04J 14/0213* (2013.01);
(Continued)

(58) Field of Classification Search
CPC .... H04J 14/0206; H04J 14/0213; H04J 14/02; H04J 14/0228; H04J 14/0238;
(Continued)

(56) References Cited

U.S. PATENT DOCUMENTS 7,603,036 B2 * 10/2009 Palacharla .......... H04J 14/0232
                                                      398/72
7,860,397 B2 * 12/2010 Mori .................. H04J 14/0247
                                                      398/83
(Continued)

FOREIGN PATENT DOCUMENTS

JP         200743270 A    2/2007
WO   WO-2018062281 A1    4/2018

OTHER PUBLICATIONS 5G wireless fronthaul requirements in a passive optical network context, International Telecommunication Union, ITU-T G-series Recommendations Supplement 66, Oct. 19, 2018.

*Primary Examiner* — Dibson J Sanchez
(74) *Attorney, Agent, or Firm* — Harness, Dickey & Pierce, P.L.C.

(57) ABSTRACT

A wavelength multiplexing communication system includes a master station apparatus and a plurality of slave station apparatuses. The master station apparatus includes a wavelength multiplexing communication unit that performs wavelength multiplexing communication with the plurality of slave station apparatuses by wavelengths the number of which is equal to or less than the number of the plurality of slave station apparatuses using an optical signal of a wavelength in a first wavelength group and an optical signal of a wavelength in a second wavelength group. The slave station apparatuses include an optical communication unit that performs communication of the main signal with the master station apparatus by an optical signal of a wavelength in the first wavelength group, which is different from a wavelength
(Continued)

in the first wavelength group used by another slave station when the main signal communication is performed in the host slave station apparatus, and performs communication of a signal other than the main signal with the master station apparatus by an optical signal of a wavelength in the second wavelength group, which is a wavelength same as a wavelength used by another slave station apparatus when the main signal communication is not performed in the host slave station apparatus.

1 Claim, 10 Drawing Sheets

(52) U.S. Cl.
CPC ........... *H04J 14/02* (2013.01); *H04J 14/0228* (2013.01); *H04J 14/0238* (2013.01); *H04J 14/0241* (2013.01); *H04J 14/08* (2013.01)

(58) Field of Classification Search
CPC .... H04J 14/0241; H04J 14/08; H04J 14/0257; H04J 14/025; H04B 10/272
USPC .................................................. 398/43–103
See application file for complete search history.

(56) References Cited

U.S. PATENT DOCUMENTS

| | | | |
|---|---|---|---|
| 8,611,745 B2* | 12/2013 | Kashima | H04J 14/0226 398/67 |
| 8,917,992 B1* | 12/2014 | Lam | H04J 14/0246 398/79 |
| 9,559,802 B1* | 1/2017 | Dashti | H04J 14/0246 |
| 2007/0092256 A1 | 4/2007 | Nozue et al. | |
| 2007/0230957 A1* | 10/2007 | Ozaki | H04J 14/0246 398/71 |
| 2008/0166127 A1* | 7/2008 | Kazawa | H04J 14/0282 398/79 |
| 2013/0039656 A1* | 2/2013 | Lam | H04J 14/0232 398/47 |
| 2013/0223841 A1* | 8/2013 | Lee | H04J 14/0252 398/72 |
| 2015/0055957 A1* | 2/2015 | Lee | H04J 14/0246 398/79 |
| 2015/0168650 A1* | 6/2015 | Okamoto | G02B 6/29361 385/24 |
| 2017/0134113 A1* | 5/2017 | Lam | H04J 14/0247 |
| 2017/0171647 A1* | 6/2017 | Gao | H04B 10/25 |
| 2017/0288804 A1* | 10/2017 | Gaudino | H04J 14/0227 |
| 2018/0145758 A1* | 5/2018 | Taguchi | H04J 14/02 |
| 2019/0372698 A1 | 12/2019 | Hisano et al. | |

* cited by examiner

WAVELENGTH MULTIPLEXING COMMUNICATION SYSTEM AND WAVELENGTH MULTIPLEXING COMMUNICATION METHOD

CROSS-REFERENCE TO RELATED APPLICATIONS

This application is a 371 U.S. National Phase of International Application No. PCT/JP2020/008619, filed on Mar. 2, 2020. The entire disclosure of the above application is incorporated herein by reference.

TECHNICAL FIELD

The present invention relates to a wavelength multiplexing communication system and a wavelength multiplexing communication method.

BACKGROUND ART

Functions of a base station in a mobile system are divided into a central unit (CU), a distributed unit (DU), and a remote unit (RU). The RU is responsible for lower layer portions of base station functions. This function of the RU is a radio communication (RF) function with a portion of a physical layer (PHY). The RU performs radio communication with a user equipment (UE).

FIG. 9 is a diagram illustrating a configuration in which a wavelength division multiplex-passive optical network (WDM-PON) system is applied to a mobile front hole (MFH). A mobile system includes a CU, N pieces of DUs, and N pieces of RUs. N pieces of DUs are described as DU #1 to DU #N, and N pieces of RUs are described as RU #1 to RU #N. The DU #m (m is an integer of 1 or greater and N or less) and RU #m are logically connected on point-to-point basis. The WDM-PON relays a main signal received by the RU #m from the UE by radio communication to the DU #m. The WDM-PON relays a main signal addressed to the UE performing radio communication with the RU #m from the DU #m to the RU #m. As illustrated in FIG. 9, the WDM-PON includes an optical line terminal (OLT) with N pieces of optical line terminal-channel terminal (OLT-CT), and N pieces of optical network units (ONUs), and is composed of N pairs of OLT-CT and ONUs. By applying such a WDM-PON configuration, the number of optical fibers of the MFH can be reduced. An OLT-CT #m that is the m-th OLT-CT and an ONU #m that is the m-th ONU transmit and receive optical signals using the wavelength $\lambda_{U-m}$ on the uplink and using the wavelength $\lambda_{D-m}$ on the downlink.

FIG. 10 is an example of a train C that travels at high speed over a track R. It is contemplated that multiple RUs are installed along the track R to provide high-speed radio communication to UEs provided on the train C or present in the train C. However, because the train C travels along the track, the main signal communication is performed only in some RUs at a certain time. For example, in FIG. 10, among the RU #1 to RU #N installed along the track, communication is performed only in the RU #2 and RU #3 that can communicate with the UE from the current position of the train C, and communication is not performed in the other RUs.

CITATION LIST

Non Patent Literature

NPL 1: "5G wireless fronthaul requirements in a passive optical network context", International Telecommunication Union, ITU-T G. Supplement 66, FIG. 9-4, p. 21, October 2018

SUMMARY OF THE INVENTION

Technical Problem

In order to achieve high-speed radio communication, it is effective to use a high frequency band capable of securing a wide frequency bandwidth. On the other hand, in the case of using the high frequency band, since the radio coverage per RU becomes small, the number of RUs required for converting a certain area into a radio area increases. When the number of RUs increases, the number of required wavelengths, the number of required OLT-CTs, and the number of required ONUs also increase, which increases equipment investment costs. As illustrated in FIG. 10, in a use case of a moving body where main signal communication is performed only in some RUs, the actual traffic amount is smaller than the system band, and thus the utilization efficiency of the system band is low.

In view of the above circumstances, an object of the present invention is to provide a wavelength multiplexing communication system and a wavelength multiplexing communication method capable of reducing costs of optical communication and improving utilization efficiency of a band.

Means for Solving the Problem

According to one aspect of the present invention, a wavelength multiplexing communication system comprises: a master station apparatus; and a plurality of slave station apparatuses. The master station apparatus includes a wavelength multiplexing communication unit configured to perform wavelength multiplexing communication with the plurality of slave station apparatuses by using an optical signal of a wavelength in a first wavelength group and an optical signal of a wavelength in a second wavelength group, with the number of wavelengths equal to or less than the number of the plurality of slave station apparatuses, and a slave station apparatus of the plurality of slave station apparatuses includes an optical communication unit configured to, when main signal communication is performed in the slave station apparatus, perform communication of a main signal with the master station apparatus by an optical signal of a wavelength in the first wavelength group, which is different from a wavelength in the first wavelength group used by another slave station apparatus of the plurality of slave station apparatuses, and when the main signal communication is not performed in the slave station apparatus, perform communication of a signal other than the main signal with the master station apparatus by an optical signal of a wavelength in the second wavelength group, which is a wavelength same as a wavelength used by another slave station apparatus of the plurality of slave station apparatuses.

According to one aspect of the present invention, a wavelength multiplexing communication method in a wavelength multiplexing communication system including a master station apparatus and a plurality of slave station apparatuses comprises: performing, by the master station apparatus, wavelength multiplexing communication with the plurality of slave station apparatuses by using an optical signal of a wavelength in a first wavelength group and an optical signal of a wavelength in a second wavelength group, with the number of wavelengths equal to or less than the number of the plurality of slave station apparatuses; and performing, by a slave station apparatus of the plurality of slave station apparatuses, when main signal communication is performed in the slave station apparatus, communication of a main signal with the master station apparatus by an optical signal of a wavelength in the first wavelength group, which is different from a wavelength in the first wavelength group used by another slave station apparatus of the plurality of slave station apparatuses, and, when the main signal communication is not performed in the slave station apparatus, communication of a signal other than the main signal with the master station apparatus by an optical signal of a wavelength in the second wavelength group, which is a wavelength same as a wavelength used by another slave station apparatus of the plurality of slave station apparatuses.

Effects of the Invention

According to the present invention, it is possible to reduce costs of optical communication and improve utilization efficiency of a band.

DESCRIPTION OF EMBODIMENTS

Hereinafter, embodiments of the present invention will be described in detail with reference to the drawings.

First Embodiment

Figure 1:
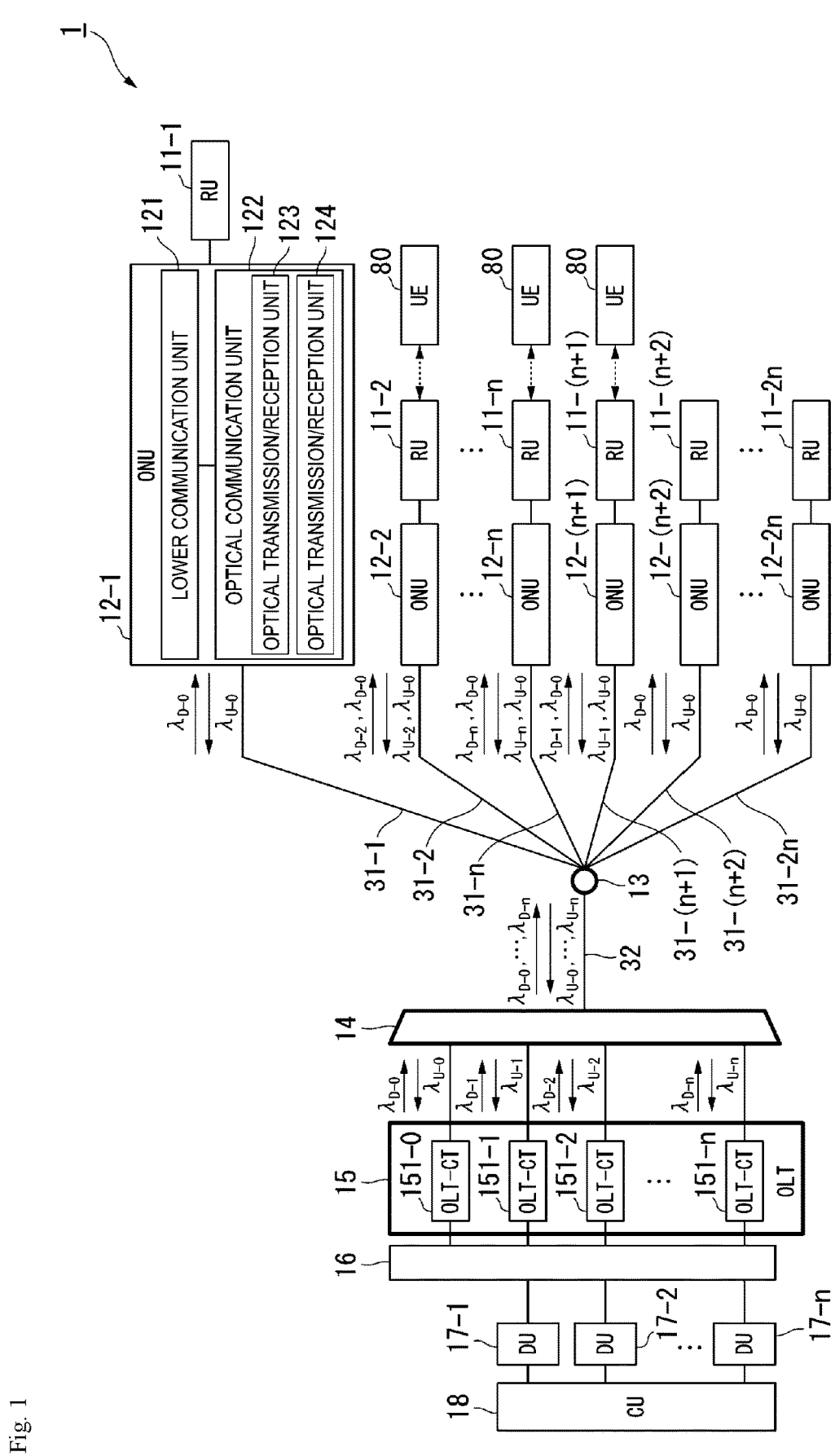
FIG. 1 is a diagram illustrating an exemplary configuration of a wavelength multiplexing communication system according to a first embodiment of the present invention.

FIG. 1 is a diagram illustrating an exemplary configuration of a wavelength multiplexing communication system 1 according to a first embodiment. The wavelength multiplexing communication system 1 relays a main signal generated in a mobile system by an optical access system. In the present embodiment, a wavelength division multiplex-passive optical network (WDM-PON) is used as the optical access system. The wavelength multiplexing communication system 1 includes an N (N is an integer of 1 or greater) remote units (RUs) 11, N optical network units (ONUs) 12, an optical coupling/splitting unit 13, a wavelength multiplexing/demultiplexing unit 14, an optical line terminal (OLT) 15, a transfer apparatus 16, n (n is an integer of 1 or greater and N or less) distributed units (DU) 17, and a central unit (CU) 18. The N RUs 11, n DUs 17, and the CU 18 constitute a mobile system. The RU 11 performs radio communication with the user equipment (UE) 80. The N ONUs 12, the optical coupling/splitting unit 13, the wavelength multiplexing/demultiplexing unit 14, and the OLT 15 constitute the optical access system. Each of the ONUs 12 and the optical coupling/splitting unit 13 are connected by a transmission line 31. The optical coupling/splitting unit 13 and the wavelength multiplexing/demultiplexing unit 14 are connected by a transmission line 32. The transmission line 31 and the transmission line 32 are each, for example, an optical fiber.

In the RU 11, main signal communication is performed by radio communication with the UE 80. Then, n is the maximum number of RUs 11 in which the main signal occurs at the same time. Since the RU 11 and the ONU 12 are connected on a one-to-one basis, n is also the maximum number of ONUs 12 that can simultaneously perform main signal communication. In the present embodiment, the N RUs 11 are referred to as RU 11-1 to RU 11-N, the N ONUs 12 are referred to as ONU 12-1 to ONU 12-N, and then DUs 17 are referred to as DU 17-1 to DU 17n. FIG. 1 illustrates an example in a case where N=2n. That is, the wavelength multiplexing communication system 1 includes RU 11-1 to RU 11-2n and ONU 12-1 to ONU 12-2n. The RU 11-j (j is an integer of 1 or greater and N or less) is connected to the ONU 12-j. The transmission line 31 between the ONU 12-j and the optical coupling/splitting unit 13 is described as a transmission line 31-j. A direction from the RU 11 to the CU 18 is uplink, and a direction from the CU 18 to the RU 11 is downlink.

When the main signal is generated in then RUs 11, the ONUs 12-1 to 12-2n and the OLT 15 of the present embodiment use the wavelengths $\lambda_{U\text{-}0}$ to $\lambda_{U\text{-}n}$ for the uplink communication and the wavelengths $\lambda_{D\text{-}0}$ to $\lambda_{D\text{-}n}$ for the downlink communication. Hereinafter, the set of the wavelengths $\lambda_{U\text{-}i}$ and $\lambda_{D\text{-}i}$ is referred to as a wavelength $\lambda_i$ (i is an integer of 0 or greater and n or less). In the present embodiment, one of the wavelengths $\lambda_0$ to $\lambda_n$ is used for the control signal for the mobile system. Here, the wavelength $\lambda_0$ is used for control signal communication. The wavelength $\lambda_0$ for control signal communication is assigned to all ONUs 12. The wavelengths $\lambda_1$ to $\lambda_n$ for main signal communication are exclusively assigned to the maximum number n of ONUs 12 in which main signal communication is performed in the same period. In the present embodiment, a wavelength assigned to a certain ONU 12 for main signal communication is always the same. For example, it is assumed that the RUs 11-1 to 11-N are sequentially installed along a route along which a moving body in which n UEs 80 are provided travels. In this case, depending on the time, the combination of RU 11 in which the main signal occurs changes. In any of the combinations that change with this time, wavelengths $\lambda_1$ to $\lambda_n$ are periodically assigned in order from the ONU 12-1 such that the wavelengths used for the RU 11 in which the main signal is generated are different from each other. As a result, when j is not a multiple of n, the wavelength $\lambda_{(j\ mod(n))}$ is fixedly assigned in advance to the ONU 12-j. Then, mod is a modulo operation. When j is a multiple of n, the wavelength $\lambda_n$ is fixedly assigned in advance to the ONU 12-j. In FIG. 1, all of the ONUs 12-1 to 12-2n use a wavelength $\lambda_0$ for the control signal, and the ONUs 12-2 to 12-(n+1) connected to each of the RUs 11-2 to 11-(n+1) in which radio communication with the UE 80 occurs exclusively use the wavelengths $\lambda_1$ to $\lambda_n$ for main signal communication. Even when the number of ONUs 12 in which the main signal communication is performed in the same period is less than n, the ONU 12 in which the main signal communication is generated uses a fixed and pre-assigned wavelength for the main signal communication.

The RU 11 performs radio communication with the UE 80 existing in a subordinate cell. There are cases where a single radio communication cell is configured by all RUs 11 and when each RU 11 configures one radio communication cell. The RU 11-j outputs a control signal of the radio system and an uplink main signal received by radio communication from the UE 80 to the ONU 12-j. The RU 11-j receives the control signal of the radio system and the main signal from the ONU 12-j, and transmits the received main signal to the UE 80 by radio communication.

The ONU 12 includes a lower communication unit 121 and an optical communication unit 122. The lower communication unit 121 of the ONU 12-j receives the control signal for the upstream radio system and the upstream main signal from the RU 11-j, and outputs them to the optical communication unit 122. The lower communication unit 121 of the ONU 12-j outputs the control signal of the downstream radio system and the downstream main signal received from the optical communication unit 122 to the RU 11-j.

The optical communication unit 122 includes optical transmission/reception units 123 and 124. The optical transmission/reception unit 123 of the ONU 12-j converts the uplink control signal from the electrical signal into an optical signal of a wavelength $\lambda_{U-0}$ and outputs the optical signal to the transmission line 31-j. The uplink control signal includes the uplink control signal of the radio system received by the lower communication unit 121. The optical transmission/reception unit 123 of the ONU 12-j receives a downlink control signal having a wavelength $\lambda_{D-0}$ among downlink wavelength-multiplexed signals transmitted through the transmission line 31-j and converts the downlink control signal into an electrical signal. The downlink control signal includes a downlink control signal of the radio system. The optical transmission/reception unit 123 outputs a downstream control signal of the radio system to the lower communication unit 121. The optical transmission/reception unit 124 of the ONU 12-j converts the uplink main signal received by the lower communication unit 121 from the RU 11-j into an optical signal of a wavelength $\lambda_{U-(j\ mod(n))}$ and outputs the optical signal to the transmission line 31-j. The optical transmission/reception unit 124 of the ONU 12-j receives a downlink main signal having a wavelength $\lambda_{D-(j\ mod(n))}$ among downlink wavelength-multiplexed signals transmitted through the transmission line 31-j. The optical transmission/reception unit 124 converts the received downlink main signal into an electrical signal and outputs the electrical signal to the lower communication unit 121.

The optical coupling/splitting unit 13 is, for example, a power splitter. The optical coupling/splitting unit 13 receives the uplink optical signals of the wavelengths $\lambda_{U-0}$ to $\lambda_{U-n}$ from the transmission line 31-1 to 31-2n, and outputs a wavelength-multiplexed signal obtained by multiplexing the received uplink optical signals to the transmission line 32. The optical coupling/splitting unit 13 receives the wavelength-multiplexed signal in which the downlink optical signals having the wavelengths $\lambda_{D-0}$ to $\lambda_{D-n}$ are multiplexed from the transmission line 32, and splits the received wavelength-multiplexed signal to output the result to the transmission lines 31-1 to 31-2n.

The wavelength multiplexing/demultiplexing unit 14 is, for example, arrayed waveguide gratings (AWG). The wavelength multiplexing/demultiplexing unit 14 demultiplexes the uplink wavelength-multiplexed signal transmitted through the transmission line 32 into the uplink optical signals of the wavelengths $\lambda_{U-0}$ to $\lambda_{U-n}$ and outputs the uplink optical signals to the OLT 15. The wavelength multiplexing/demultiplexing unit 14 multiplexes the downlink optical signals having the wavelengths $\lambda_{D-0}$ to $\lambda_{D-n}$ output from the OLT 15, and outputs the multiplexed optical signals to the transmission line 32 as a wavelength-multiplexed signal.

The OLT 15 includes (n+1) OLT-CTs 151. The OLT-CT 151 terminates the channel of the optical signal. The OLT-CT 151 converts the received upstream optical signal into a signal frame of an electrical signal and outputs the signal frame to the transfer apparatus 16, and converts the signal frame of the electrical signal received from the transfer apparatus 16 into an optical signal and outputs the optical signal to the wavelength multiplexing/demultiplexing unit 14. The (n+1) OLT-CTs 151 are referred to as OLT-CTs 151-0 to 151-n. The OLT-CT 151-i (i is an integer of 0 or greater and n or less) transmits a downlink optical signal of a wavelength and receives an uplink optical signal of a wavelength $\lambda_{U-i}$. The wavelength $\lambda_{D-0}$ and the wavelength $\lambda_{U-0}$ are for control signal communication and the wavelengths $\lambda_{D-1}$ to $\lambda_{D-n}$ and the wavelengths $\lambda_{U-0}$ to $\lambda_{U-n}$ are for main signal communication. That is, the OLT-CT 151-0 transmits and receives a control signal, and the OLT-CTs 151-1 to 151-n transmit and receive a main signal.

The transfer apparatus 16 receives the control signal frame in which the uplink control signal is set from the OLT-CT 151-0, and transfers the received control signal frame to the DU 17 that is the destination of the received control signal frame. The transfer apparatus 16 receives the main signal frame in which the uplink main signal is set from the OLT-CTs 151-1 to 151-n, and outputs the main signal frame to the DU 17 that is the destination of the received main signal frame. The transfer apparatus 16 receives a downlink control signal frame and a main signal frame from each DU 17. When receiving the control signal frame and the main signal frame from the same DU 17, the transfer apparatus 16 demultiplexes the control signal frame and the main signal frame. The transfer apparatus 16 outputs the control signal frame to the OLT-CT 151-0, and outputs the main signal frame to the OLT-CT 151 corresponding to the wavelength for main signal communication used by the ONU 12 that is the destination. As described above, the transfer apparatus 16 multiplexes and transfers the control signal and the main signal to the same DU 17 in the case of the uplink, and demultiplexes the control signal and the main signal received from the same DU 17 and outputs the signals to different OLT-CTs 151 in the case of the downlink.

The DU 17 outputs the uplink main signal received from the transfer apparatus 16 to the CU 18, and outputs the downlink main signal input from the CU 18 to the transfer apparatus 16. Each DU 17 is logically connected to the RU 11 on point-to point basis for the main signal. The CU 18 outputs uplink main signals input from the DUs 17-1 to 17-n to a higher-level apparatus (not illustrated), and outputs downlink main signals received from the higher-level apparatus (not illustrated) to the DUs 17-1 to 17-n.

Figure 2:
FIG. 2 is a diagram illustrating a use case of a moving body of the wavelength multiplexing communication system according to the first embodiment.

FIG. 2 is a diagram illustrating a use case of a moving body of the wavelength multiplexing communication system 1. The right column of FIG. 2 illustrates the RU 11 communicating with the UE 80 at each time and the wavelength used by the ONU 12. The left column of FIG. 2 illustrates signals transmitted and received in the optical access section between each ONU 12 and the OLT 15 at each time. Here, t indicates time.

The UE 80 is provided on the train C that moves at high speed on the track R, or is present in the train C. Along the track R, RUs 11-1 to 11-N are installed. FIG. 2 illustrates RUs up to the RU 11-4. In FIG. 2, there are two UEs 80, and two RUs 11 (n=2) at the maximum perform radio communication in the same period. Wavelengths $\lambda_0$ and $\lambda_2$ are assigned to the ONUs 12-1 and 12-3, and wavelengths $\lambda_0$ and $\lambda_1$ are assigned to the ONUs 12-2 and 12-4.

At time T1, each of the RUs 11-1 and 11-2 performs radio communication with the corresponding UE 80. The uplink communication at time T1 will be described. The RU 11-1 outputs an uplink main signal received by radio communication from the UE 80 to the ONU 12-1, and the RU 11-2 outputs an uplink main signal received by radio communication from the UE 80 to the ONU 12-2. Each RU 11-j outputs a control signal of the radio system to the ONU 12-j. The optical transmission/reception unit 123 of each ONU 12-j outputs, to the transmission line 31-j, an optical signal of a wavelength $\lambda_{U-0}$ including an uplink control signal of the radio system received by the lower communication unit 121 from the RU 11-j. The optical transmission/reception unit 124 of the ONU 12-1 converts the uplink main signal received by the lower communication unit 121 from the RU 11-1 into an optical signal of a wavelength $\lambda_{U-1}$ and outputs the optical signal to the transmission line 31-1, and the optical transmission/reception unit 124 of the ONU 12-2 converts the uplink main signal received by the lower communication unit 121 from the RU 11-2 into an optical signal of a wavelength $\lambda_{U-2}$ and outputs the optical signal to the transmission line 31-2.

The optical coupling/splitting unit 13 outputs a wavelength-multiplexed signal obtained by multiplexing the uplink optical signals of the wavelengths $\lambda_{U-0}$ to $\lambda_{U-2}$ to the transmission line 32. The wavelength multiplexing/demultiplexing unit 14 demultiplexes the uplink wavelength-multiplexed signal transmitted through the transmission line 32 into the uplink optical signals of the wavelengths $\lambda_{U-0}$ to $\lambda_{U-2}$. The wavelength multiplexing/demultiplexing unit 14 outputs a light signal of a wavelength $\lambda_{U-0}$ to the OLT-CT 151-0, an optical signal of a wavelength $\lambda_{U-1}$ to the OLT-CT 151-1, and an optical signal of a wavelength $\lambda_{U-2}$ to the OLT-CT 151-2. Each of the OLT-CTs 151-0, 151-1, and 151-2 converts the input optical signal into a signal frame of an electrical signal and outputs the signal frame to the transfer apparatus 16.

The transfer apparatus 16 transfers the control signal frame received from the OLT-CT 151-0 to the DU 17 that is the destination. The transfer apparatus 16 receives the main signal frames from the OLT-CT 151-1 and the OLT-CT 151-2 and outputs each of the main signal frames to the DU 17 that is the destination. The DU 17 outputs the uplink main signal received from the transfer apparatus 16 to the CU 18, and the CU 18 outputs the uplink main signal input from the DU 17 to a higher apparatus (not illustrated).

Next, downlink communication at the time T1 will be described. The CU 18 receives a downlink main signal from a higher apparatus (not illustrated) and outputs the downlink main signal to the DU 17 in accordance with the destination. The DU 17 outputs a signal frame of a down link control signal and a signal frame of a downlink main signal from the CU 18. The transfer apparatus 16 outputs the downlink control signal frame to the OLT-CT 151-0, and outputs the downlink main signal frame to the OLT-CT 151-1 and the OLT-CT 151-2 according to the destination. The OLT-CT 151-0 converts the downlink control signal frame into an optical signal of a wavelength $\lambda_{D-0}$, and outputs the optical signal to the wavelength multiplexing/demultiplexing unit 14. The OLT-CT 151-1 converts the downlink main signal frame into an optical signal of a wavelength $\lambda_{D-1}$, and outputs the optical signal into the wavelength multiplexing/demultiplexing unit 14, and the OLT-CT 151-2 converts the downlink main signal frame into an optical signal of a wavelength $\lambda_{D-2}$, and outputs the optical signal to the wavelength multiplexing/demultiplexing unit 14.

The wavelength multiplexing/demultiplexing unit 14 outputs a wavelength-multiplexed signal obtained by multiplexing the downlink optical signals of the wavelengths $\lambda_{D-0}$, $\lambda_{D-1}$, and $\lambda_{D-2}$ output by the OLT 15, to the transmission line 32. The optical coupling/splitting unit 13 receives the wavelength-multiplexed signal from the transmission line 32, splits the received wavelength-multiplexed signal, and outputs the result to the corresponding transmission line among the transmission lines 31-1 to 31-N.

The optical transmission/reception unit 123 of each of the ONUs 12-1 to 12-N receives a control signal of a wavelength $\lambda_{D-0}$ from the wavelength-multiplexed signal and converts the control signal into an electrical signal. The lower communication unit 121 of each ONU 12-j outputs the control signal of the radio system to the RU 11-j. The optical transmission/reception unit 124 of the ONU 12-1 selects and receives a main signal of a wavelength $\lambda_{D-1}$ from the wavelength-multiplexed signal, and converts the received main signal into an electrical signal. The lower communication unit 121 of the ONU 12-1 outputs the main signal converted into the electrical signal to the RU 11-1. The optical transmission/reception unit 124 of the ONU 12-2 selects and receives a main signal of a wavelength $\lambda_{D-2}$ from the wavelength-multiplexed signal, and converts the received main signal into an electrical signal. The lower communication unit 121 of the ONU 12-2 outputs the main signal converted into the electrical signal to the RU 11-2. The RU 11-1 transmits by radio communication the main signal received from the ONU 12-1 to the UE 80, and the RU 11-2 transmits by radio communication the main signal received from the ONU 12-2 to the UE 80.

The train C travels and, at time T2, each of the RUs 11-2 and 11-3 performs radio communication with the corresponding UE 80. The uplink communication at the time T2 will be described. The RU 11-2 outputs an uplink main signal received by radio communication from the UE 80 to the ONU 12-2, and the RU 11-3 outputs an uplink main signal received by radio communication from the UE 80 to the ONU 12-3. Each RU 11-j outputs a control signal of the radio system to the ONU 12-j. Each ONU 12-j outputs, to the transmission line 31-j, an optical signal of a wavelength $\lambda_{U-0}$ including an uplink control signal of the radio system. The ONU 12-2 converts the uplink main signal received from the RU 11-2 into an optical signal of a wavelength $\lambda_{U-2}$ and outputs the optical signal to the transmission line 31-2, and the ONU 12-3 converts the uplink main signal received from the RU 11-3 into an optical signal of a wavelength $\lambda_{U-1}$ and outputs the optical signal to the transmission line 31-3. The subsequent processing is similar to that in the case of the time T1.

The operation of the downlink communication at the time T2 is similar to that at the time T1 up to the part where the optical coupling/splitting unit 13 outputs the wavelength-multiplexed signal received from the transmission line 32 to the transmission lines 31-1 to 31-N. Each of the ONUs 12-1 to 12-N receives a control signal of a wavelength $\lambda_{D-0}$ from the wavelength-multiplexed signal and converts the control signal into an electrical signal. Each ONU 12-$j$ outputs a control signal of the radio system to the RU 11-$j$. The ONU 12-2 selects and receives a main signal of a wavelength $\lambda_{D-2}$ from the wavelength-multiplexed signal, converts the received main signal into an electrical signal, and outputs the main signal converted into the electrical signal to the RU 11-2. The ONU 12-3 selects and receives a main signal of a wavelength $\lambda_{D-1}$ from the wavelength-multiplexed signal, converts the received main signal into an electrical signal, and outputs the main signal converted into the electrical signal to the RU 11-3. The RU 11-2 transmits by radio communication the main signal received from the ONU 12-2 to the UE 80, and the RU 11-3 transmits by radio communication the main signal received from the ONU 12-3 to the UE 80.

The train C travels and, at time T3, each of the RUs 11-3 and 11-4 performs radio communication with the corresponding UE 80. The uplink communication at the time T3 will be described. The RU 11-3 outputs an uplink main signal received by radio communication from the UE 80 to the ONU 12-3, and the RU 11-4 outputs an uplink main signal received by radio communication from the UE 80 to the ONU 12-4. Each RU 11$j$ outputs a control signal of the radio system to the ONU 12$j$. Each ONU 12$j$ outputs, to the transmission line 31-$j$, an optical signal of a wavelength $\lambda_{U-0}$ including an uplink control signal of the radio system. The ONU 12-3 converts the uplink main signal received from the RU 11-3 into an optical signal of a wavelength $\lambda_{U-1}$ and outputs the optical signal to the transmission line 31-3, and the ONU 12-4 converts the uplink main signal received from the RU 11-4 into an optical signal of a wavelength 4-2 and outputs the optical signal to the transmission line 31-4. The subsequent processing is similar to that in the case of the time T1.

The operation of the downlink communication at the time T3 is similar to that at the time T1 up to the part where the optical coupling/splitting unit 13 outputs the wavelength-multiplexed signal received from the transmission line 32 to the transmission lines 31-1 to 31-N. Each of the ONUs 12-1 to 12-N receives a control signal of a wavelength $\lambda_{D-0}$ from the wavelength-multiplexed signal and converts the control signal into an electrical signal. Each ONU 12$j$ outputs a control signal of the radio system to the RU 11$j$. The ONU 12-3 selects and receives a main signal of a wavelength $\lambda_{D-1}$ from the wavelength-multiplexed signal, converts the received main signal into an electrical signal, and outputs the main signal converted into the electrical signal to the RU 11-3. The ONU 12-4 receives a main signal of a wavelength $\lambda_{D-2}$ from the wavelength-multiplexed signal, converts the received main signal into an electrical signal, and outputs the main signal converted into the electrical signal to the RU 11-4. The RU 11-3 transmits by radio communication the main signal received from the ONU 12-3 to the UE 80, and the RU 11-4 transmits by radio communication the main signal received from the ONU 12-4 to the UE 80.

Figure 3:
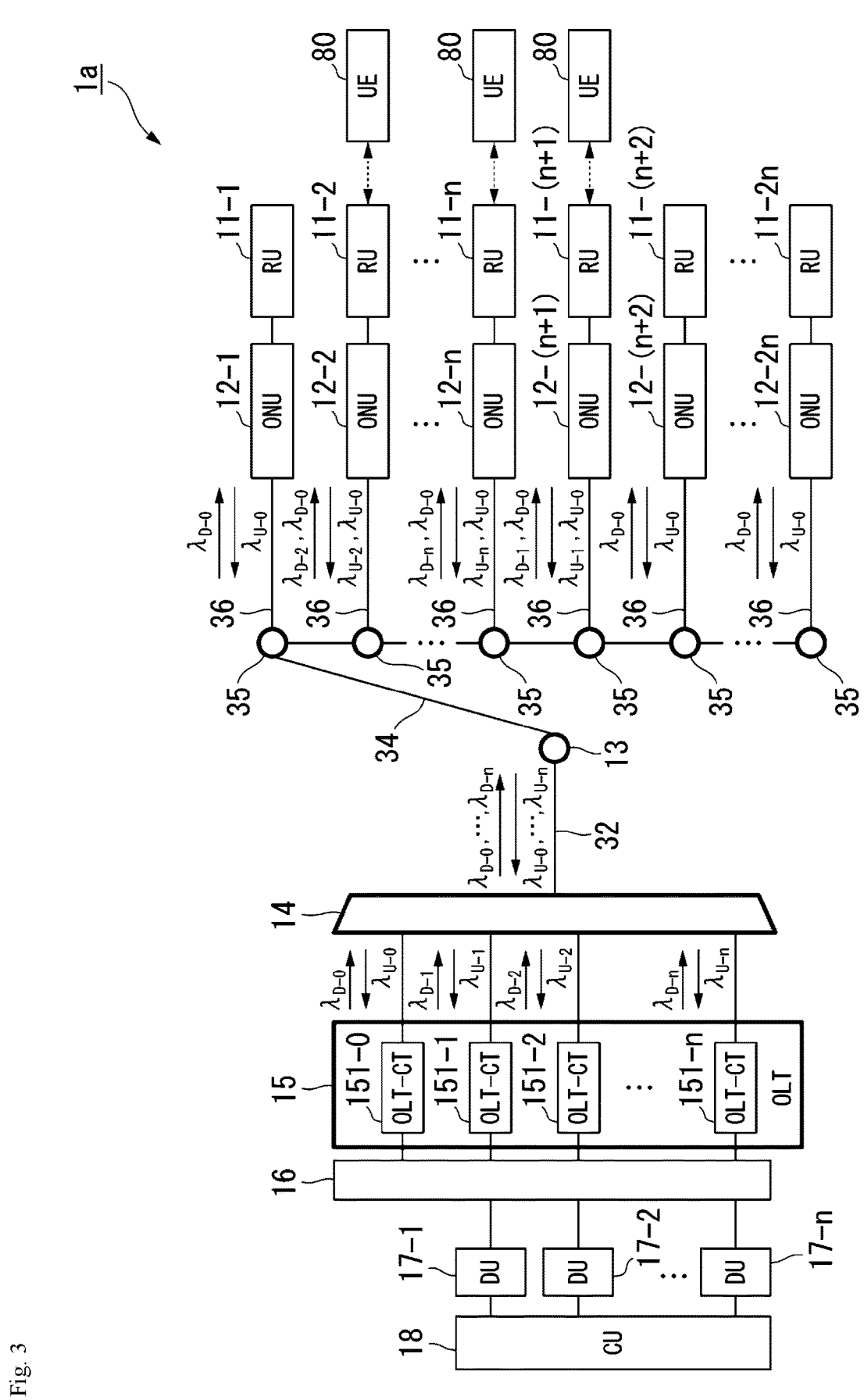
FIG. 3 is a diagram illustrating another exemplary configuration of the wavelength multiplexing communication system according to the first embodiment.

In the wavelength multiplexing communication system 1 illustrated in FIG. 1, a network configuration of an MFH section is star type, but may be a bus type as illustrated in FIG. 3. FIG. 3 is a diagram illustrating an exemplary configuration of a wavelength multiplexing communication system 1$a$ according to the first embodiment. In FIG. 3, parts that are the same as those of the wavelength multiplexing communication system 1 illustrated in FIG. 1 are denoted by the same reference signs, and description thereof will be omitted. In the wavelength multiplexing communication system 1$a$ illustrated in FIG. 3, the optical coupling/splitting unit 13 is connected to the transmission lines 32 and 34. The transmission line 34 is provided with a plurality of optical coupling/splitting unit 35. Each of the ONUs 12 and the optical coupling/splitting unit 35 are connected by a transmission line 36. The optical coupling/splitting unit 35 outputs the uplink signal received from the ONU 12 to the transmission line 34. The optical coupling/splitting unit 35 splits the downlink wavelength-multiplexed signal transmitted through the transmission line 34 and outputs the result to the transmission line 36. The optical coupling/splitting unit 13 outputs a wavelength-multiplexed signal obtained by multiplexing the uplink optical signals of wavelengths transmitted through the transmission line 34 to the transmission line 32. The optical coupling/splitting unit 13 outputs the downlink wavelength-multiplexed signal transmitted through the transmission line 32 to the transmission line 34.

As described above, in the present embodiment, the OLT and each ONU transmit and receive control signals of the mobile system with a wavelength $\lambda_0$, with or without a main signal of the mobile system. For each ONU 12, main signal communication is performed using the wavelengths $\lambda_1$ to $\lambda_n$ exclusively assigned for main signal communication only for a period during which main signal communication is performed in the RU. The maximum number of RUs in which the main signal communication is performed in the same period is n. Therefore, the number of OLT-CTs and the number of wavelengths used can be reduced from N to (n+1) in the related art. As a result, system utilization efficiency is improved for band demand, and capital investment costs can be reduced. Since the control signal does not flow in the wavelength for main signal communication, high-speed radio communication with the UE can be achieved.

In the embodiment described above, the case where the signal other than the main signal is the control signal has been described as an example, but the signal other than the control signal may be used. In the embodiment described above, one wavelength is assigned to each of the uplink communications and the downlink communications other than the main signal, but a plurality of wavelengths may be assigned. Also in this case, in each of the uplink and the downlink, the total of the number of wavelengths used for communication of signals other than the main signal and the number of wavelengths for main signal communication is set to equal to or less than N. The number of OLT-CTs included in the OLT is the sum of the number of wavelengths used for communication of signals other than the main signal and the number of wavelengths for main signal communication. For example, in the case where the wavelengths $\lambda_0$, $\lambda_0'$ are assigned to signals other than the main signal, the OLT includes an OLT-CT that transmits and receives wavelengths $\lambda_0$, $\lambda_0'$, $\lambda_1$, . . . , $\lambda_n$. Each ONU transmits and receives signals other than the main signal using one or both of wavelengths $\lambda_0$ and $\lambda_0'$. The wavelengths $\lambda_1$, . . . , $\lambda_n$ are exclusively assigned to an ONU that performs main signal communication.

Second Embodiment

In the first embodiment, the wavelength used for main signal communication is fixed for each ONU. In a second embodiment, the wavelength for main signal communication used by each ONU is dynamically changed. Hereinafter, differences from the first embodiment will be mainly described.

Figure 4:
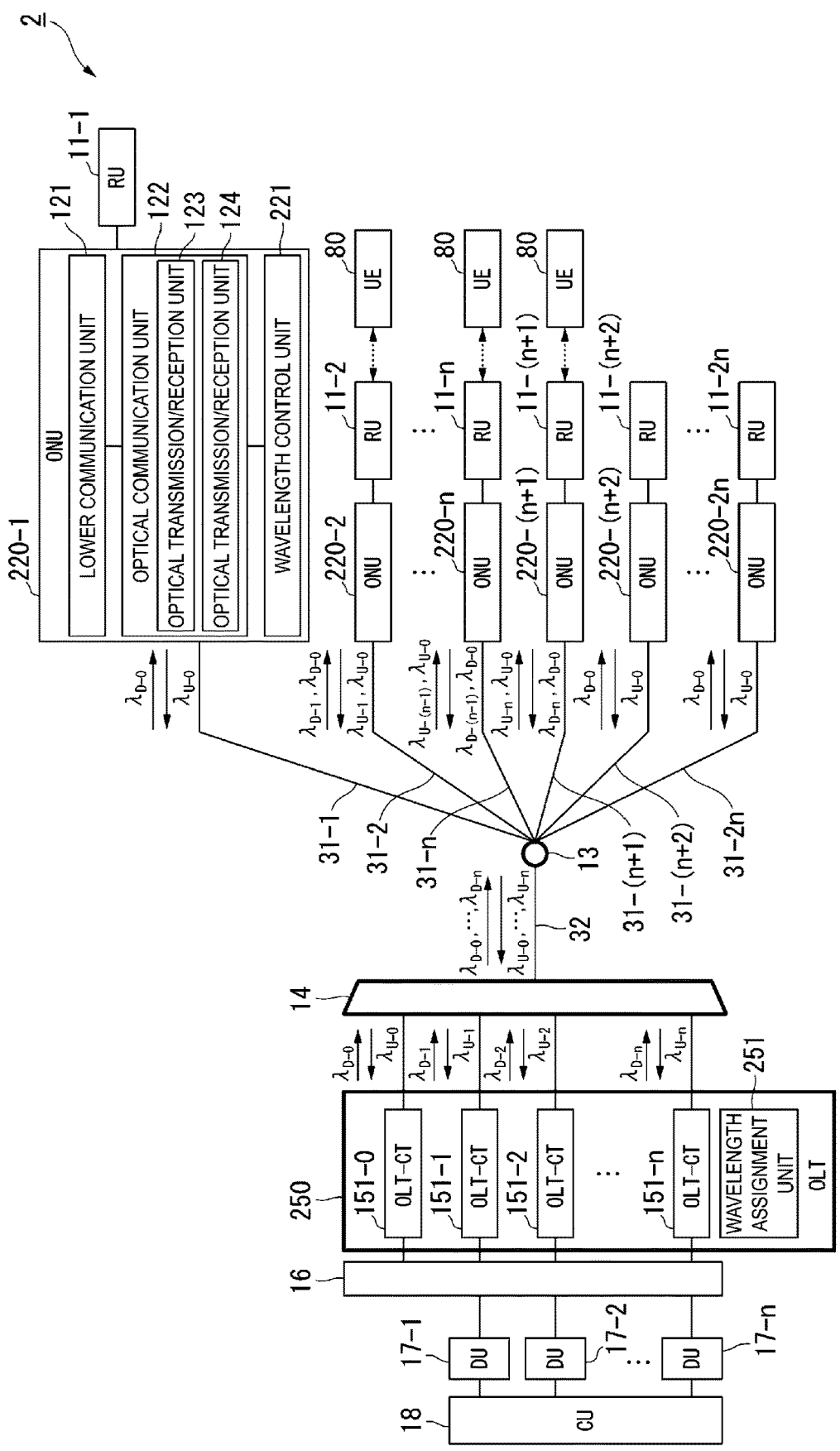
FIG. 4 is a diagram illustrating an exemplary configuration of a wavelength multiplexing communication system according to a second embodiment.

FIG. 4 is a diagram illustrating an exemplary configuration of a wavelength multiplexing communication system 2 according to the second embodiment. In FIG. 4, parts that are the same as those of the wavelength multiplexing communication system 1 illustrated in FIG. 1 are denoted by the same reference signs, and description thereof will be omitted. The wavelength multiplexing communication system 2 illustrated in FIG. 4 is different from the wavelength multiplexing communication system 1 illustrated in FIG. 1 in that the wavelength multiplexing communication system 2 includes ONUs 220 instead of the ONUs 12 and an OLT 250 instead of the OLT 15. A j-th ONU 220 (j is an integer equal to or greater than 1 and equal to or less than N) is referred to as an ONU 220-j. As similar to the wavelength multiplexing communication system 1a illustrated in FIG. 3, the network configuration of the MFH section may be a bus type.

The ONU 220 is different from the ONU 20 of the first embodiment in that the ONU 220 further includes a wavelength control unit 221. The wavelength control unit 221 controls the optical transmission/reception unit 124 to dynamically change the wavelength for the main signal communication. The optical transmission/reception unit 124 is, for example, a wavelength variable transceiver.

The OLT 250 is different from the OLT 15 of the first embodiment in that the OLT 250 further includes a wavelength assignment unit 251. The wavelength assignment unit 251 may be provided in an apparatus external to the OLT 250. The wavelength assignment unit 251 dynamically and exclusively assigns wavelengths $\lambda_1$ to $\lambda_n$ for up to n ONUs 220 in which main signal communication is performed during the same period. For example, the wavelength assignment unit 251 assigns wavelengths such that the ONU 220-2 performs main signal communication with the wavelength $\lambda_1$, the ONU 220-3 performs main signal communication with the wavelengths $\lambda_2$, . . . , and the ONU 220-(n+1) performs main signal communication with the wavelength $\lambda_n$ in a certain period, and the ONU 220-3 performs main signal communication with the wavelengths $\lambda_1$, the ONU 220-4 performs main signal communication with the wavelengths $\lambda_2$, . . . , and the ONU 220-(n+2) performs main signal communication with the wavelength $\lambda_n$ in a period different from the certain period. For example, the wavelength assignment unit 251 changes the assignment when the set of ONUs 220 in which the main signal is generated is changed, but may change the assignment at another timing.

For example, for the ONU 220 in which the main signal communication is performed, determination is made as follows. The wavelength assignment unit 251 of the OLT 250 stores train operation information in advance. The operation information is information capable of obtaining a correspondence between the time and the position of the train at the time. The wavelength assignment unit 251 periodically refers to the operation information to obtain the current position of the train. Alternatively, the wavelength assignment unit 251 receives position information indicating the current position of the train from an external device if there is a change in position. For example, a camera, a sensor, or the like detects the proximity of the train and notifies the OLT 250 of the position information of the train. The wavelength assignment unit 251 stores correspondence information indicating a correspondence between the position of the train and the ONU 220 or the RU 11 in which the main signal communication is performed. The wavelength assignment unit 251 obtains information on the ONU 220 or the RU 11 corresponding to the current position of the train from the correspondence information. As a result, the wavelength assignment unit 251 obtains information on the ONU 220 in which the main signal is generated and the ONU 220 in which the generation of the main signal is terminated. The wavelength assignment unit 251 exclusively assigns a wavelength for main signal communication to the ONU 220 in which the main signal is generated.

Alternatively, each ONU 220 may notify the OLT 250 of generation and termination of the main signal by a control signal. For example, when the wavelength control unit 221 of the ONU 220 detects a signal in which an identifier indicating a main signal is set in a buffer that temporarily stores a signal transmitted from the optical communication unit 122, the wavelength control unit 221 of the ONU 220 detects generation of the main signal. Furthermore, when the wavelength control unit 221 detects that there is only a signal in which an identifier indicating a control signal is set in a buffer that temporarily stores a signal transmitted from the optical communication unit 122, the wavelength control unit 221 detects that the generation of the main signal is terminated. For example, the identifier indicating the main signal and the setting contents of the message type "ecpriMessage" can be used as the identifier indicating the main signal.

Alternatively, the wavelength control unit 221 of the ONU 220 may monitor the lower communication unit 121, and detects the occurrence of the main signal communication in a case where the reception rate or the transmission rate exceeds a certain value, and detect the termination of main signal communication in a case where the reception rate or the transmission rate continuously falls below the certain value for a certain period.

As described above, when the wavelength assignment unit 251 of the OLT 250 obtains information of the ONUs 220 in which the main signal communication is performed in the same period, the wavelength assignment unit 251 dynamically assigns different wavelengths of the wavelengths $\lambda_1$ to $\lambda_n$ to the ONUs 220. The assigned wavelength is notified to the ONU 220 by a control signal, for example.

Figure 5:
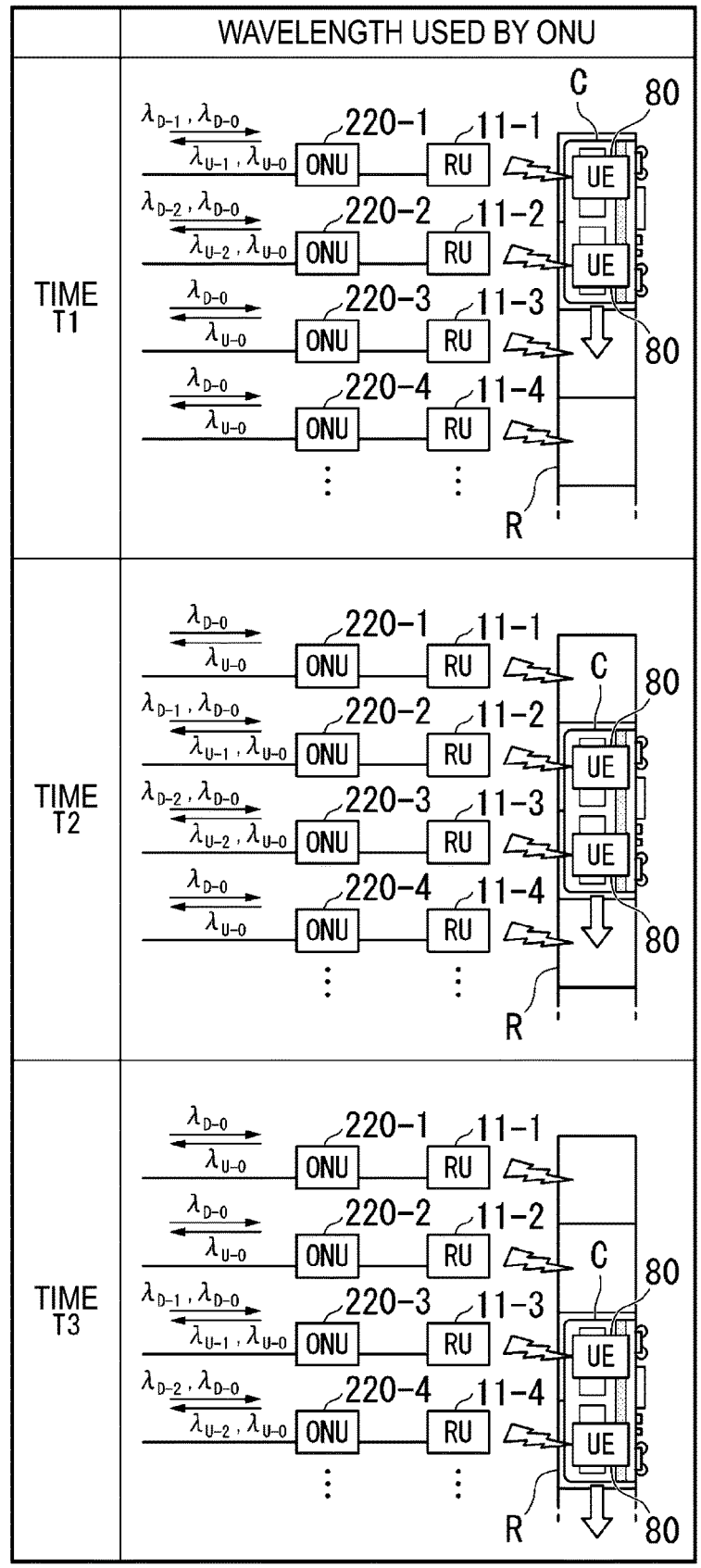
FIG. 5 is a diagram illustrating a use case of a moving body of the wavelength multiplexing communication system according to the second embodiment.

FIG. 5 is a diagram illustrating a use case of a moving body of the wavelength multiplexing communication system 2. FIG. 5 illustrates the RU 11 communicating with the UE 80 at each time and the wavelength used by the ONU 220. As similar to FIG. 2, the UEs 80 are provided in the train C moving at a high speed on the track R, and the RUs 11-1 to 11-N are installed along the track R. A case where there are two UEs 80 provided in the train C or present in the train C, and up to two RUs 11 (n=2) perform radio communication in the same period will be described as an example.

At time T1, each of the RUs 11-1 and 11-2 performs radio communication with the corresponding UE 80. In this case, the wavelength assignment unit 251 of the OLT 250 transmits a control signal for assigning the wavelength $\lambda_1$ for main signal communication to the ONU 220-1, and transmits a control signal for assigning the wavelength $\lambda_2$ for main signal communication to the ONU 220-2. When receiving the control signal, the wavelength control unit 221 of the ONU 220-1 controls the optical communication unit 122 to transmit and receive the main signal at the wavelength $\lambda_1$. When receiving the control signal, the wavelength control unit 221 of the ONU 220-2 controls the optical communication unit 122 to transmit and receive the main signal at the wavelength $\lambda_2$. The wavelength assignment unit 251 of the OLT 250 may further transmit a control signal for assigning the wavelength $\lambda_0$ for control signal communication to all the ONUs 220. The uplink communication and the downlink communication of the wavelength multiplexing communication system 2 at the time T1 after the wavelength assignment are similar to the uplink communication and the downlink communication of the wavelength multiplexing communication system 1 at the time T1 illustrated in FIG. 2.

At the time T2, the RU 11-1 terminates the radio communication and the RUs 11-2 and 11-3 perform radio communication with the UE 80. The wavelength assignment unit 251 of the OLT 250 detects the termination of the main signal communication in the ONU 220-1 and the start of the main signal communication in the ONU 220-3. The wavelength assignment unit 251 transmits a control signal that cancels assignment of the wavelength $\lambda_1$ for the main signal communication to the ONU 220-1. The wavelength assignment unit 251 transmits a control signal instructing the ONU 220-2 to change the wavelength for main signal communication from the wavelength $\lambda_2$ to the wavelength $\lambda_1$. Furthermore, the wavelength assignment unit 251 transmits a control signal to assign a wavelength $\lambda_2$ to the ONU 220-3. When receiving the control signal, the wavelength control unit 221 of the ONU 220-1 controls the optical communication unit 122 to stop using the wavelength $\lambda_1$. When receiving the control signal, the wavelength control unit 221 of the ONU 220-2 controls the optical communication unit 122 to transmit and receive the main signal with the wavelength $\lambda_1$. When receiving the control signal, the wavelength control unit 221 of the ONU 220-3 controls the optical communication unit 122 to transmit and receive the main signal with the wavelength $\lambda_2$. The uplink communication and the downlink communication of the wavelength multiplexing communication system 2 at the time T2 after wavelength assignment is similar to the uplink communication and the downlink communication at the time T2 illustrated in FIG. 2 except that a wavelength $\lambda_{U-1}$ is used for the uplink main signal from the ONU 220-2, a wavelength $\lambda_{D-1}$ is used for the downlink main signal to the ONU 220-2, a wavelength $\lambda_{U-2}$ is used for the downlink main signal to the ONU 220-3, a wavelength $\lambda_{D-2}$ is used for the downlink main signal to the ONU 220-3.

At the time T3, the RU 11-2 terminates the radio communication and each of the RUs 11-3 and the RU 11-4 performs radio communication with the corresponding UE 80. The wavelength assignment unit 251 of the OLT 250 detects the termination of the main signal communication in the ONU 220-2 and the start of the main signal communication in the ONU 220-4. The wavelength assignment unit 251 transmits a control signal that cancels assignment of the wavelength $\lambda_1$ for the main signal communication to the ONU 220-2. The wavelength assignment unit 251 transmits a control signal instructing the ONU 220-3 to change the wavelength for main signal communication from the wavelength $\lambda_2$ to the wavelength $\lambda_1$. Furthermore, the wavelength assignment unit 251 transmits a control signal to assign a wavelength $\lambda_2$ to the ONU 220-4. When receiving the control signal, the wavelength control unit 221 of the ONU 220-2 controls the optical communication unit 122 to stop using the wavelength $\lambda_1$. When receiving the control signal, the wavelength control unit 221 of the ONU 220-3 controls the optical communication unit 122 to transmit and receive the main signal with the wavelength $\lambda_1$. When receiving the control signal, the wavelength control unit 221 of the ONU 220-4 controls the optical communication unit 122 to transmit and receive the main signal with the wavelength 22. The uplink communication and the downlink communication of the wavelength multiplexing communication system 2 at the time T3 after the wavelength assignment are similar to the uplink communication and the downlink communication of the wavelength multiplexing communication system 1 at the time T3 illustrated in FIG. 2.

The signals transmitted and received in the optical access section between each ONU of the ONUs 220-1 to 220-4 and the OLT 250 at each of the times T1, T2, and T3 are similar to the signals between each ONU of the ONUs 12-1 to 12-4 and the OLT 15 illustrated in the left column of FIG. 2.

In the first embodiment, the wavelength for main signal communication is fixed and assigned to each ONU in advance. However, as similar to the present embodiment, a wavelength assignment unit may be provided in the OLT or the outside of the OLT, and the wavelength assignment unit may assign a wavelength for main signal communication that is different from the wavelength for main signal communication of other ONUs and is fixed to each ONU, to up to n ONUs in which a main signal is generated.

Third Embodiment

In the first embodiment, both an ONU that performs main signal communication of a mobile system and an ONU that does not perform main signal communication use a wavelength different from that of main signal communication for communication of a control signal of the mobile system. In the present embodiment, the ONU that performs main signal communication of the mobile system also performs communication of the control signal with the wavelength for the main signal communication. Hereinafter, differences from the first embodiment will be mainly described.

Figure 6:
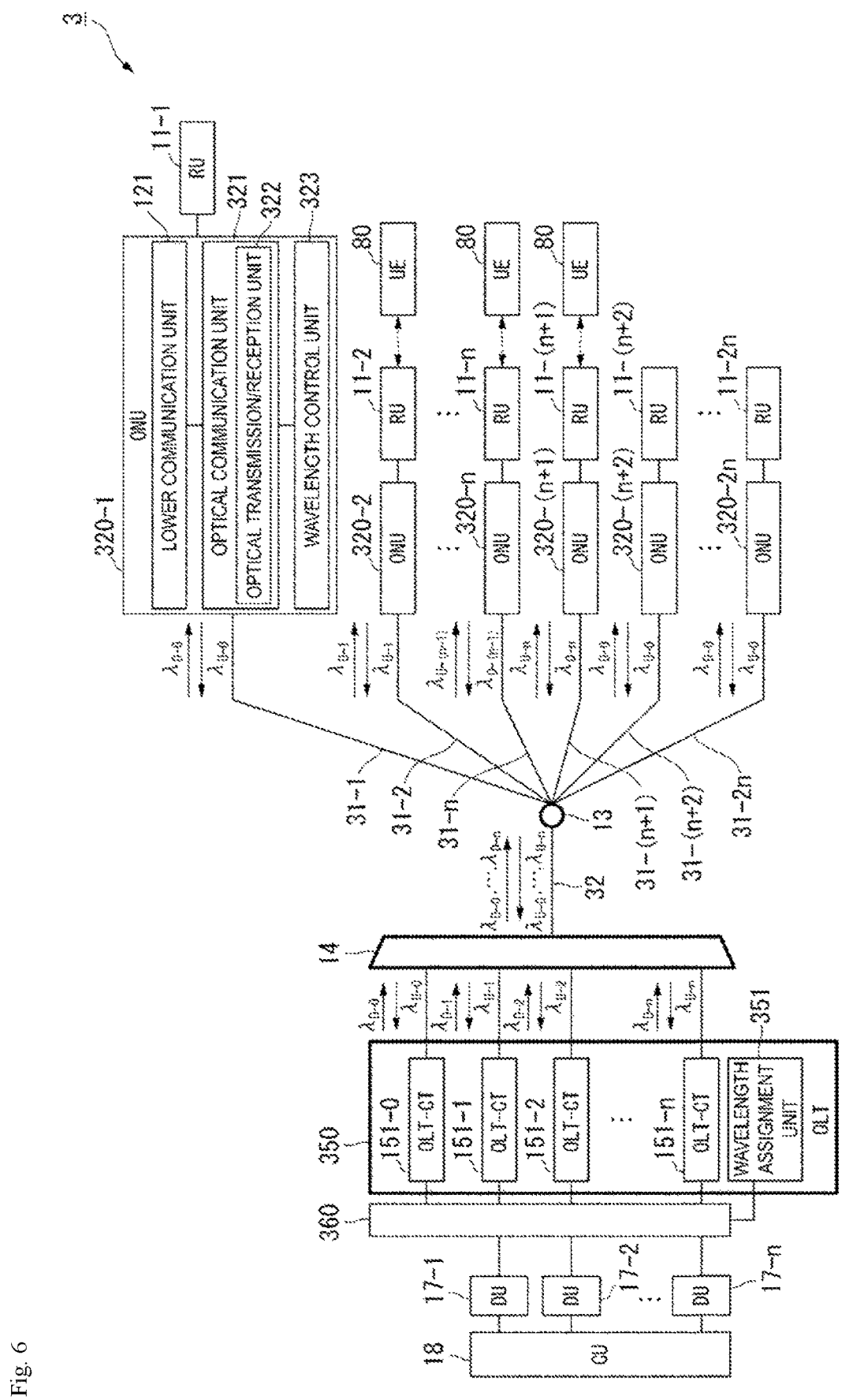
FIG. 6 is a diagram illustrating an exemplary configuration of a wavelength multiplexing communication system according to a third embodiment.

FIG. 6 is a diagram illustrating an exemplary configuration of a wavelength multiplexing communication system 3 according to a third embodiment. In FIG. 6, parts that are the same as those of the wavelength multiplexing communication system 1 illustrated in FIG. 1 are denoted by the same reference signs, and description thereof will be omitted. The wavelength multiplexing communication system 3 illustrated in FIG. 6 is different from the wavelength multiplexing communication system 1 illustrated in FIG. 1 in that the wavelength multiplexing communication system 3 includes ONUs 320 instead of the ONUs 12, an OLT 350 instead of the OLT 15, and a transfer apparatus 360 instead of the transfer apparatus 16. A j-th ONU 320 (j is an integer equal to or greater than 1 and equal to or less than N) is referred to as an ONU 320-j. As similar to the wavelength multiplexing communication system 1a illustrated in FIG. 3, the network configuration of the MFH section may be a bus type.

In the present embodiment, wavelengths $\lambda_0$ to $\lambda_n$ are used for communication between the ONUs 320 and the OLT 350, and wavelengths $\lambda_1$ to $\lambda_n$ are used for main signal communication. As similar to the first embodiment, the wavelength assigned to a certain ONU 320 for main signal communication for the ONU 320 is always the same. As similar to the first embodiment, when j is not a multiple of n, a wavelength $\lambda_{(j\ mod(n))}$ is assigned to the ONU 320-j, and when j is a multiple of n, a wavelength $\lambda_n$ is assigned to the ONU 320-j. The present embodiment is different from the first embodiment in that the up to n ONUs 320 that perform the main signal communication perform the main signal communication and the control signal communication by using the wavelength $\lambda_{(j\ mod(n))}$ in a case where j is not a multiple of n, and by using the wavelength $\lambda_n$ in a case where j is a multiple of n. The ONU 320 that does not perform the main signal communication performs control signal communication by using the wavelength $\lambda_0$. Logically, the RU 11-1 and the DU 17-1 are connected on a one-to-one basis, and the RU 11-2 and the DU 17-2 are connected on a one-to-one basis. As similar to this, logically, the RU 11*j* and the DU 17-(*j* mod(n)) in which j is not a multiple of n are connected on a one-to-one basis, and the RU 11*j* and the DU 17-*n* in which j is a multiple of n are connected on a one-to-one basis.

The ONU 320 is different from the ONU 20 of the first embodiment in that the ONU 320 further includes an optical communication unit 321 instead of the optical communication unit 122, and a wavelength control unit 323. The optical communication unit 321 includes an optical transmission/reception unit 322. The optical transmission/reception unit 322 is a variable optical transceiver. As similar to the optical communication unit 122 of the first embodiment, the optical communication unit 321 may include the optical transmission/reception units 123 and 124. The optical communication unit 321 uses the optical transmission/reception unit 123 for communication of a control signal when there is no main signal communication, and uses the optical transmission/reception unit 124 for communication of a main signal and a control signal when there is main signal communication. When the main signal communication is not performed in the host ONU, the wavelength control unit 323 controls the optical communication unit 321 to transmit the uplink control signal with the wavelength $\lambda_{U\text{-}0}$, and transmit the downlink control signal with the wavelength $\lambda_{D\text{-}0}$. When the main signal communication is performed in the host ONU, the wavelength control unit 323 of the ONU 320-*j* in which j is not a multiple of n controls the optical communication unit 321 to transmit an uplink control signal with a wavelength $\lambda_{U\text{-}(j\ mod(n))}$, and transmit the downlink control signal with a wavelength $\lambda_{D\text{-}(j\ mod(n))}$, and the wavelength control unit 323 of the ONU 320-*j* in which j is a multiple of n controls the optical communication unit 321 to transmit the uplink control signal by a wavelength $\lambda_{U\text{-}n}$, and transmit the downlink control signal by a wavelength $\lambda_{D\text{-}n}$.

The OLT 350 is different from the OLT 15 of the first embodiment in that the OLT 350 further includes a wavelength assignment unit 351. The wavelength assignment unit 351 may be provided in an apparatus external to the OLT 350. The wavelength assignment unit 351 instructs up to n ONUs 320-*j* in which main signal communication is performed during the same period to use a wavelength $\lambda_{(j\ mod(n))}$ when j is not a multiple of n, and to use a wavelength $\lambda_n$ when j is a multiple of n. The wavelength assignment unit 351 instructs the ONU 320 in which the main signal communication is not performed, to use a wavelength $\lambda_0$. The wavelength assignment unit 351 outputs information on the DU 11 in which the main signal is generated and information on the ONU 320 to which any of wavelengths $\lambda_1$ to $\lambda_n$ has been exclusively assigned, to the transfer apparatus 360.

The transfer apparatus 360 does not identify the control signal frame and the main signal frame, and performs distribution on the basis of information on a destination or a transmission source set in the frame and whether main signal communication is performed in the RU 11. The transfer apparatus 360 may determine that main signal communication is performed in the RU 11*j* that is connected to the ONU 320-*j* to which any of wavelengths $\lambda_1$ to $\lambda_n$ has been exclusively assigned. The transfer apparatus 360 transfers the uplink signal received from the OLT-CT 151 to the DU 17 of the destination set to the uplink signal. The transfer apparatus 360 receives a downlink signal destined for the RU 11*j* in which j is not a multiple of n from the DU 17-(*j* mod(n)), and receives a downlink signal destined for the RU 11*j* in which j is a multiple of n from the DU 17-*n*. When a main signal is generated in the RU 11*j* of the destination of the downlink signal and any of wavelengths $\lambda_1$ to $\lambda_n$ is exclusively assigned to the ONU 320-*j* connected to the RU 11*j*, the transfer apparatus 360 transfers the downlink signal to the OLT-CT 151 corresponding to the wavelength assigned to the ONU 320-*j*. When a main signal is not generated in the RU 11*j* of the destination of the downlink signal and the wavelength $\lambda_0$ is assigned to the ONU 320-*j* connected to the RU 11*j*, the transfer apparatus 360 transfers the downlink signal to the OLT-CT 151-0.

The OLT 350 and the ONU 320 can detect the RU 11 or the ONU 220 in which main signal communication is performed in a similar manner to that in the second embodiment. When the wavelength control unit 323 of the ONU 320 detects the occurrence of main signal communication without assignment of a wavelength by the wavelength assignment unit 351 of the OLT 350, the wavelength control unit 323 of the ONU 320 may control the optical transmission/reception unit 322 to use a wavelength for main signal communication assigned in advance. On the other hand, in the transfer apparatus 360, it is necessary to refer to the information on the DU 11 in which the main signal is generated and information on the ONU 320 to which any of the wavelengths $\lambda_1$ to $\lambda_n$ has been exclusively assigned. Thus, the wavelength control unit 323 of the ONU 320 notifies the OLT 350 or the transfer apparatus 360 of the occurrence and termination of the main signal communication.

The ONU 320 may determine the occurrence and termination of the main signal communication as follows, in addition to the method described in the second embodiment. The OLT 350 notifies the ONU 320 of the operation information of the train. The wavelength control unit 323 of the ONU 320 stores the received operation information, and periodically refers to the operation information to obtain the current position of the train. Alternatively, the wavelength control unit 323 of the ONU 320 may receive position information indicating the current position of the train from the OLT 350, the camera, or the sensor. The wavelength control unit 323 stores correspondence information indicating correspondence with the ONU 320 or the RU 11 in which the main signal communication is performed, and obtains information on the ONU 320 or the RU 11 according to the current position of the train with reference to the correspondence information. As a result, the wavelength control unit 323 determines the generation of the main signal and the termination of the generation in the host slave station apparatus.

Figure 7:
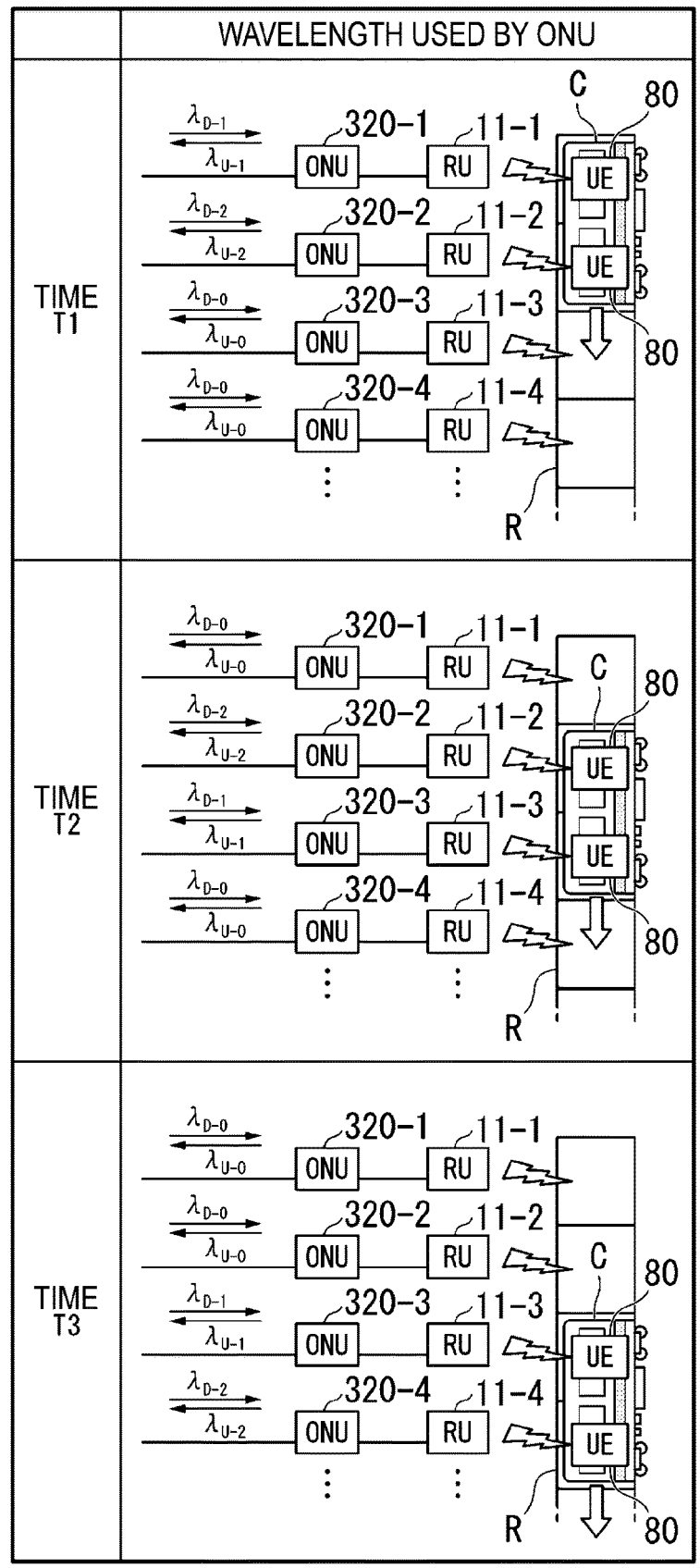
FIG. 7 is a diagram illustrating a use case of a moving body of the wavelength multiplexing communication system according to the third embodiment.

FIG. 7 is a diagram illustrating a use case of a moving body of the wavelength multiplexing communication system 3. FIG. 7 illustrates the RU 11 communicating with the UE 80 at each time and the wavelength used by the ONU 320. As similar to FIG. 2, the UEs 80 are provided in the train C moving at a high speed on the track R, and the RUs 11-1 to 11-N are installed along the track R. A case where there are two UEs 80 provided in the train C, and up to two RUs 11 (n=2) perform radio communication in the same period will be described as an example.

At time T1, each of the RUs 11-1 and 11-2 performs radio communication with the corresponding UE 80. In this case, the wavelength assignment unit 351 of the OLT 350 transmits a control signal for assigning a wavelength $\lambda_1$ to the ONU 320-1, transmits a control signal for assigning a wavelength $\lambda_2$ to the ONU 320-2, and transmits a control signal for assigning a wavelength $\lambda_0$ to the ONUs 320-3 to 320-N. The wavelength assignment unit 351 outputs, to the transfer apparatus 360, information indicating that the main signal is generated in the RU 11-1 and the RU 11-2, and information indicating that the wavelength $\lambda_1$ is exclusively assigned to the ONU 320-1, and the wavelength $\lambda_2$ is exclusively assigned to the ONU 320-2. When receiving the control signal, the wavelength control unit 323 of the ONU 320-1 controls the optical communication unit 321 to transmit and receive the optical signal with the wavelength $\lambda_1$. When receiving the control signal, the wavelength control unit 323 of the ONU 320-2 controls the optical communication unit 321 to transmit and receive the optical signal with the wavelength $\lambda_2$. When receiving the control signal, the wavelength control unit 323 of each of the ONUs 320-3 to 320-N controls the optical communication unit 321 to transmit and receive the optical signal with the wavelength $\lambda_0$.

The uplink communication at time T1 will be described. The RU 11-1 outputs an uplink main signal received by radio communication from the UE 80 and destined for the DU 17-1 to the ONU 320-1, and the RU 11-2 outputs an uplink main signal received by radio communication from the UE 80 and destined for the DU 17-2 to the ONU 320-2. Each RU 11$j$ outputs a control signal of the radio system to the ONU 320-$j$. The destination of the control signal is DU 17-($j$ mod(n)) when j is not a multiple of n, and DU 17-n when j is a multiple of n.

The optical transmission/reception unit 322 of the ONU 320-1 converts the uplink control signal of the optical access system and the uplink control signal and the uplink main signal of the radio system received by the lower communication unit 121 from the RU 11-1 into an optical signal of a wavelength $\lambda_{U-1}$, and outputs the optical signal to the transmission line 31-1. The optical transmission/reception unit 322 of the ONU 320-2 converts the uplink control signal of the optical access system and the uplink control signal and the uplink main signal of the radio system received by the lower communication unit 121 from the RU 11-2 into an optical signal of a wavelength $\lambda_{U-2}$, and outputs the optical signal to the transmission line 31-2. The optical transmission/reception unit 322 of the ONU 320-$j$ excluding j=1, 2 converts the uplink control signal of the optical access system and the uplink control signal of the radio system received by the lower communication unit 121 from the RU 11$j$ into an optical signal of a wavelength $\lambda_{U-0}$, and outputs the optical signal to the transmission line 31$j$.

The optical coupling/splitting unit 13 outputs a wavelength-multiplexed signal obtained by multiplexing the uplink optical signals of the wavelengths $\lambda_{U-0}$ to $\lambda_{U-2}$ to the transmission line 32. The wavelength multiplexing/demultiplexing unit 14 demultiplexes the uplink wavelength-multiplexed signal transmitted through the transmission line 32 into the uplink optical signals of the wavelengths $\lambda_{U-0}$ to $\lambda_{U-2}$. The wavelength multiplexing/demultiplexing unit 14 outputs a light signal of a wavelength $\lambda_{U-0}$ to the OLT-CT 151-0, an optical signal of a wavelength $\lambda_{U-1}$ to the OLT-CT 151-1, and an optical signal of a wavelength $\lambda_{U-2}$ to the OLT-CT 151-2. Each of the OLT-CTs 151-0, 151-1, and 151-2 converts the input optical signal into an electrical signal and output the electrical signal to the transfer apparatus 360.

The transfer apparatus 360 receives the control signal from the OLT-CT 151-0. The transmission source of the control signal is the ONU 320-$j$ excluding the ONUs 320-1 and 320-2, and the destination is the DU 17 logically connected to the ONU 320-$j$. The destination is DU 17-($j$ mod(n)) when j is not a multiple of n, and DU 17-n when j is a multiple of n. The transfer apparatus 360 transfers the control signal received from the OLT-CT 151-0 to the DU 17 that is the destination. The transfer apparatus 360 receives the main signal and the control signal from the OLT-CT 151-1 and transfers these signals to the DU 17-1 that is the destination. The transfer apparatus 360 receives the main signal and the control signal from the OLT-CT 151-2 and transfers these signals to the DU 17-2 that is the destination. The DUs 17-1 and 17-2 output the main signals to the CU 18.

Next, downlink communication at the time T1 will be described. The CU 18 outputs a downlink main signal destined for the RU 11-1 to the DU 17-1, and outputs a downlink main signal addressed to the RU 11-2 to the DU 17-2. The DU 17-1 outputs the main signal and the control signal addressed to the RU 11-1 to the transfer apparatus 360, and the DU 17-2 outputs the main signal and the control signal addressed to the RU 11-2 to the transfer apparatus 360. The DU 17-($j$ mod(n)) (however, when j is a multiple of n, DU 17-n) excluding j=1, 2 outputs the control signal addressed to the RU 11$j$ to the transfer apparatus 360.

The transfer apparatus 360 receives a main signal and a control signal destined for the RU 11-1 from the DU 17-1. Since a main signal is generated in the RU 11-1 and a wavelength $\lambda_1$ is exclusively assigned to the ONU 320-1, the transfer apparatus 360 transfers the main signal and the control signal destined for the RU 11-1 to the OLT-CT 151-1 corresponding to the wavelength $\lambda_1$. As similar to this, the transfer apparatus 360 receives a main signal and a control signal destined for the RU 11-2 from the DU 17-2. Since a main signal is generated in the RU 11-2 and a wavelength $\lambda_2$ is exclusively assigned to the ONU 320-2, the transfer apparatus 360 transfers the main signal and the control signal destined for the RU 11-2 to the OLT-CT 151-2 corresponding to the wavelength $\lambda_2$. The transfer apparatus 360 receives the control signal destined for the RU 11$j$ excluding j=1, 2 from the DU 17-($j$ mod(n)) (however, when j is a multiple of n, DU 17-n). Since a main signal is not generated in the RU 11$j$ and a wavelength $\lambda_0$ that is also assigned to another ONU 320 is assigned to the ONU 320-$j$, the transfer apparatus 360 transfers the control signal destined for the RU 11$j$ to the OLT-CT 151-0.

The OLT-CT 151-0 converts the downlink control signal destined for each of the ONUs 320-3 to 320-N into an optical signal of a wavelength $\lambda_{D-0}$, and outputs the optical signal to the wavelength multiplexing/demultiplexing unit 14. The OLT-CT 151-1 converts the downlink main signal and the downlink control signal destined for the ONU 320-1 into an optical signal of a wavelength $\lambda_{D-1}$ and outputs the optical signal to the wavelength multiplexing/demultiplexing unit 14, and the OLT-CT 151-2 converts a downlink main signal and a downlink control signal destined for the ONU 320-2 into an optical signal of a wavelength $\lambda_{D-2}$ and outputs the optical signal to the wavelength multiplexing/demultiplexing unit 14.

The wavelength multiplexing/demultiplexing unit 14 outputs a wavelength-multiplexed signal obtained by multiplexing the downlink optical signals of the wavelengths $\lambda_{D-0}$, $\lambda_{D-1}$, and $\lambda_{D-2}$ output by the OLT 350, to the transmission line 32. The optical coupling/splitting unit 13 receives the wavelength-multiplexed signal from the transmission line 32, splits the received wavelength-multiplexed signal, and outputs the result to the corresponding transmission line among the transmission lines 31-1 to 31-N.

The optical transmission/reception unit 322 of the ONU 320-1 receives a control signal and a main signal of a wavelength $\lambda_{D-1}$ from the wavelength-multiplexed signal and converts the control signal and the main signal into an electrical signal. The optical transmission/reception unit 322 of the ONU 320-2 receives a control signal and a main signal of a wavelength $\lambda_{D\text{-}2}$ from the wavelength-multiplexed signal and converts the control signal and the main signal into an electrical signal. The optical transmission/reception unit 123 of each of the ONUs 320-3 to 320-N receives a control signal of a wavelength of $\lambda_{D\text{-}0}$ from the wavelength-multiplexed signal and converts the control signal into an electrical signal. The lower communication unit 121 of the ONU 320-1 outputs the main signal and the control signal of the radio system to the RU 11-1, and the lower communication unit 121 of the ONU 320-2 outputs the main signal and the control signal of the radio system to the RU 11-2. The lower communication unit 121 of each ONUs 320-3 to 320-N outputs the control signal of the radio system to the corresponding RU among the RUs 11-3 to 11-N.

At time T2, each of the RUs 11-2 and 11-3 performs radio communication with the corresponding UE 80. The wavelength assignment unit 351 of the OLT 350 transmits a control signal for assigning a wavelength $\lambda_2$ to the ONU 320-2, transmits a control signal for assigning a wavelength $\lambda_1$ to the ONU 320-3, and transmits a control signal for assigning a wavelength $\lambda_0$ to the ONU 320-1 and the ONUs 320-4 to 320-N. The wavelength assignment unit 351 outputs, to the transfer apparatus 360, information indicating that the main signal is generated in the RU 11-2 and the RU 11-3, and information indicating that the wavelength $\lambda_2$ is exclusively assigned to the ONU 320-2, and the wavelength $\lambda_1$ is exclusively assigned to the ONU 320-3. When receiving the control signal, the wavelength control unit 323 of the ONU 320-2 controls the optical communication unit 321 to transmit and receive the optical signal with the wavelength $\lambda_2$. When receiving the control signal, the wavelength control unit 323 of the ONU 320-3 controls the optical communication unit 321 to transmit and receive the optical signal with the wavelength $\lambda_1$. When receiving the control signal, the wavelength control unit 323 of each of the ONUs 320-1 and 320-4 to 320-N controls the optical communication unit 321 to transmit and receive the optical signal with the wavelength $\lambda_0$. The wavelength control unit 323 may not transmit a control signal for assigning a wavelength to any of the ONU 320-2 and the ONUs 320-4 to 320-N whose wavelengths to be used do not change from the time T1.

The uplink communication at the time T2 will be described. The RU 11-2 outputs an uplink main signal received by radio communication from the UE 80 and destined for the DU 17-2 to the ONU 320-2, and the RU 11-3 outputs an uplink main signal received by radio communication from the UE 80 and destined for the DU 17-1 to the ONU 320-3. Each RU 11*j* outputs a control signal of the radio system to the ONU 320-*j*. The destination of the control signal is DU 17-(*j* mod(n)) when j is not a multiple of n, and DU 17-*n* when j is a multiple of n.

The optical transmission/reception unit 322 of the ONU 320-2 converts the uplink control signal of the optical access system and the uplink control signal and the uplink main signal of the radio system received by the lower communication unit 121 from the RU 11-2 into an optical signal of a wavelength of $\lambda_{U\text{-}2}$, and outputs the optical signal to the transmission line 31-2. The optical transmission/reception unit 322 of the ONU 320-3 converts the uplink control signal of the optical access system and the uplink control signal and the uplink main signal of the radio system received by the lower communication unit 121 from the RU 11-3 into an optical signal of a wavelength of $\lambda_{U\text{-}1}$, and outputs the optical signal to the transmission line 31-3. The optical transmission/reception unit 322 of the ONU 320-*j* excluding j=2, 3 converts the uplink control signal of the optical access system and the uplink control signal of the radio system received by the lower communication unit 121 from the RU 11*j* into an optical signal of a wavelength of $\lambda_{U\text{-}0}$, and outputs the optical signal to the transmission line 31*j*.

The operation from when the optical coupling/splitting unit 13 outputs the wavelength-multiplexed signal obtained by multiplexing the upstream optical signals of the wavelengths $\lambda_{U\text{-}0}$ to $\lambda_{U\text{-}2}$ to the transmission line 32 to when the OLT-CTs 151-0, 151-1, and 151-2 convert the input optical signals into electrical signals and output the electrical signals to the transfer apparatus 360 is similar to that at the time T1.

The transfer apparatus 360 receives the control signal from the OLT-CT 151-0. The transmission source of the control signal is the ONU 320-*j* excluding the ONUs 320-2 and 320-3, and the destination is the DU 17 logically connected to the ONU 320-*j*. The destination is DU 17-(*j* mod(n)) when j is not a multiple of n, and DU 17-*n* when j is a multiple of n. The transfer apparatus 360 transfers the control signal received from the OLT-CT 151-0 to the DU 17 that is the destination. The transfer apparatus 360 receives the main signal and the control signal from the OLT-CT 151-2 and transfers these signals to the DU 17-2 that is the destination. The transfer apparatus 360 receives the main signal and the control signal from the OLT-CT 151-1 and transfers these signals to the DU 17-1 that is the destination. The DUs 17-1 and 17-2 output the main signals to the CU 18.

Next, downlink communication at the time T2 will be described. The CU 18 outputs a downlink main signal destined for the RU 11-2 to the DU 17-2, and outputs a downlink main signal destined for the RU 11-3 to the DU 17-1. The DU 17-2 outputs the main signal and the control signal destined for the RU 11-2 to the transfer apparatus 360, and the DU 17-1 outputs the main signal and the control signal destined for the RU 11-3 to the transfer apparatus 360. The DU 17-(*j* mod(n)) (however, when j is a multiple of n, DU 17-*n*) excluding j=2, 3 outputs the control signal addressed to the RU 11*j* to the transfer apparatus 360.

The transfer apparatus 360 receives a main signal and a control signal destined for the RU 11-2 from the DU 17-2. Since a main signal is generated in the RU 11-2 and a wavelength $\lambda_2$ is exclusively assigned to the ONU 320-2, the transfer apparatus 360 transfers the main signal and the control signal destined for the RU 11-2 to the OLT-CT 151-2 corresponding to the wavelength $\lambda_2$. As similar to this, the transfer apparatus 360 receives a main signal and a control signal destined for the RU 11-3 from the DU 17-1. Since a main signal is generated in the RU 11-3 and a wavelength $\lambda_1$ is exclusively assigned to the ONU 320-3, the transfer apparatus 360 transfers the main signal and the control signal destined for the RU 11-3 to the OLT-CT 151-1 corresponding to the wavelength $\lambda_1$. The transfer apparatus 360 receives the control signal destined for the RU 11*j* excluding j=2, 3 from the DU 17-(*j* mod(n)) (however, when j is a multiple of n, DU 17-*n*). Since a main signal is not generated in the RU 11*j* and a wavelength $\lambda_0$ that is also assigned to another ONU 320 is assigned to the ONU 320-*j*, the transfer apparatus 360 transfers the control signal destined for the RU 11*j* to the OLT-CT 151-0.

The OLT-CT 151-0 converts the downlink control signal destined for each of the ONUs 320-1 and 320-4 to 320-N into an optical signal of a wavelength of $\lambda_{D\text{-}0}$, and outputs the optical signal to the wavelength multiplexing/demultiplexing unit 14. The OLT-CT 151-1 converts the downlink main signal and the downlink control signal destined for the ONU 320-3 into an optical signal of a wavelength $\lambda_{D\text{-}1}$ and outputs the optical signal to the wavelength multiplexing/ demultiplexing unit 14, and the OLT-CT 151-2 converts a downlink main signal and a downlink control signal destined for the ONU 320-2 into an optical signal of a wavelength $\lambda_{D\text{-}2}$ and outputs the optical signal to the wavelength multiplexing/demultiplexing unit 14.

The wavelength multiplexing/demultiplexing unit 14 outputs a wavelength-multiplexed signal obtained by multiplexing the downlink optical signals of the wavelengths $\lambda_{D\text{-}0}$, $\lambda_{D\text{-}1}$, and $\lambda_{D\text{-}2}$ output by the OLT 350, to the transmission line 32. The optical coupling/splitting unit 13 receives the wavelength-multiplexed signal from the transmission line 32, splits the received wavelength-multiplexed signal, and outputs the result to the corresponding transmission line among the transmission lines 31-1 to 31-N.

The optical transmission/reception unit 322 of the ONU 320-2 receives a control signal and a main signal of a wavelength $\lambda_{D\text{-}2}$ from the wavelength-multiplexed signal and converts the control signal and the main signal into an electrical signal. The optical transmission/reception unit 322 of the ONU 320-3 receives a control signal and a main signal of a wavelength $\lambda_{D\text{-}1}$ from the wavelength-multiplexed signal and converts the control signal and the main signal into an electrical signal. The optical transmission/reception unit 123 of each of the ONUs 320-1 and 320-4 to 320-N receives a control signal of a wavelength of $\lambda_{D\text{-}0}$ from the wavelength-multiplexed signal and converts the control signal into an electrical signal. The lower communication unit 121 of the ONU 320-2 outputs the main signal and the control signal of the radio system to the RU 11-2, and the lower communication unit 121 of the ONU 320-3 outputs the main signal and the control signal of the radio system to the RU 11-3. The lower communication unit 121 of the ONU 320-j excluding j=2, 3 outputs the control signal for the radio system to the RU 11j.

At time T3, each of the RUs 11-3 11-4 performs radio communication with the corresponding UE 80. The wavelength assignment unit 351 of the OLT 350 transmits a control signal for assigning a wavelength $\lambda_1$ to the ONU 320-3, transmits a control signal for assigning a wavelength $\lambda_2$ to the ONU 320-4, and transmits a control signal for assigning a wavelength $\lambda_0$ to the ONU 320-j excluding j=3, 4. The wavelength assignment unit 351 outputs, to the transfer apparatus 360, information indicating that the main signal is generated in the RU 11-3 and the RU 11-4, and information indicating that the wavelength $\lambda_1$ is exclusively assigned to the ONU 320-3, and the wavelength $\lambda_2$ is exclusively assigned to the ONU 320-4. When receiving the control signal, the wavelength control unit 323 of the ONU 320-3 controls the optical communication unit 321 to transmit and receive the optical signal with the wavelength $\lambda_1$. When receiving the control signal, the wavelength control unit 323 of the ONU 320-4 controls the optical communication unit 321 to transmit and receive the optical signal with the wavelength $\lambda_2$. When receiving the control signal, the wavelength control unit 323 of the ONU 320-j excluding j=3, 4 controls the optical communication unit 321 to transmit and receive the optical signal with the wavelength $\lambda_0$. The wavelength control unit 323 may not transmit a control signal for assigning a wavelength to the ONU 320-1 and the ONUs 320-5 to 320-N whose wavelengths to be used do not change from the time T2.

The uplink communication at the time T3 will be described. The RU 11-3 outputs an uplink main signal received by radio communication from the UE 80 and destined for the DU 17-1 to the ONU 320-3, and the RU 11-4 outputs an uplink main signal received by radio communication from the UE 80 and destined for the DU 17-2 to the ONU 320-4. Each RU 11j outputs a control signal of the radio system to the ONU 320-j. The destination of the control signal is DU 17-(j mod(n)) when j is not a multiple of n, and DU 17-n when j is a multiple of n.

The optical transmission/reception unit 322 of the ONU 320-3 converts the uplink control signal of the optical access system and the uplink control signal and the uplink main signal of the radio system received by the lower communication unit 121 from the RU 11-3 into an optical signal of a wavelength of $\lambda_{U\text{-}1}$, and outputs the optical signal to the transmission line 31-3. The optical transmission/reception unit 322 of the ONU 320-4 converts the uplink control signal of the optical access system and the uplink control signal and the uplink main signal of the radio system received by the lower communication unit 121 from the RU 11-4 into an optical signal of a wavelength $\lambda_{U\text{-}2}$, and outputs the optical signal to the transmission line 31-4. The optical transmission/reception unit 322 of the ONU 320-j excluding j=3, 4 converts the uplink control signal of the optical access system and the uplink control signal of the radio system received by the lower communication unit 121 from the RU 11j into an optical signal of a wavelength $\lambda_{U\text{-}0}$, and outputs the optical signal to the transmission line 31j.

The operation from when the optical coupling/splitting unit 13 outputs the wavelength-multiplexed signal obtained by multiplexing the upstream optical signals of the wavelengths $\lambda_{U\text{-}0}$ to $\lambda_{U\text{-}2}$ to the transmission line 32 to when the OLT-CTs 151-0, 151-1, and 151-2 convert the input optical signals into electrical signals and output the electrical signals to the transfer apparatus 360 is similar to that at the time T1.

The transfer apparatus 360 receives the control signal from the OLT-CT 151-0. The transmission source of the control signal is the ONU 320-j excluding the ONUs 320-3 and 320-4, and the destination is the DU 17 logically connected to the ONU 320-j. The destination is DU 17-(j mod(n)) when j is not a multiple of n, and DU 17-n when j is a multiple of n. The transfer apparatus 360 transfers the control signal received from the OLT-CT 151-0 to the DU 17 that is the destination. The transfer apparatus 360 receives the main signal and the control signal from the OLT-CT 151-1 and transfers these signals to the DU 17-1 that is the destination. The transfer apparatus 360 receives the main signal and the control signal from the OLT-CT 151-2 and transfers these signals to the DU 17-2 that is the destination. The DUs 17-1 and 17-2 output the main signals to the CU 18.

Next, downlink communication at the time T3 will be described. The CU 18 outputs a downlink main signal destined for the RU 11-3 to the DU 17-1, and outputs a downlink main signal destined for the RU 11-4 to the DU 17-2. The DU 17-1 outputs the main signal and the control signal destined for the RU 11-3 to the transfer apparatus 360, and the DU 17-2 outputs the main signal and the control signal destined for the RU 11-4 to the transfer apparatus 360. The DU 17-(j mod(n)) (however, when j is a multiple of n, DU 17-n) excluding j=3, 4 outputs the control signal addressed to the RU 11j to the transfer apparatus 360.

The transfer apparatus 360 receives a main signal and a control signal destined for the RU 11-3 from the DU 17-1. Since a main signal is generated in the RU 11-3 and a wavelength $\lambda_1$ is exclusively assigned to the ONU 320-3, the transfer apparatus 360 transfers the main signal and the control signal destined for the RU 11-3 to the OLT-CT 151-1 corresponding to the wavelength $\lambda_1$. As similar to this, the transfer apparatus 360 receives a main signal and a control signal destined for the RU 11-4 from the DU 17-2. Since a main signal is generated in the RU 11-4 and a wavelength $\lambda_2$ is exclusively assigned to the ONU 320-4, the transfer apparatus 360 transfers the main signal and the control signal destined for the RU 11-4 to the OLT-CT 151-2 corresponding to the wavelength $\lambda_2$. The transfer apparatus 360 receives the control signal destined for the RU 11*j* excluding j=3, 4 from the DU 17-(*j* mod(n)) (however, when j is a multiple of n, DU 17-*n*). Since a main signal is not generated in the RU 11*j* and a wavelength $\lambda_0$ that is also assigned to another ONU 320 is assigned to the ONU 320-*j*, the transfer apparatus 360 transfers the control signal destined for the RU 11*j* to the OLT-CT 151-0.

The OLT-CT 151-0 converts the downlink control signal destined for each of the ONU 320-1, ONU 320-2, and the ONUs 320-5 to 320-N into an optical signal of a wavelength of $\lambda_{D\text{-}0}$, and outputs the optical signal to the wavelength multiplexing/demultiplexing unit 14. The OLT-CT 151-1 converts the downlink main signal and the downlink control signal destined for the ONU 320-3 into an optical signal of a wavelength $\lambda_{D\text{-}1}$ and outputs the optical signal to the wavelength multiplexing/demultiplexing unit 14, and the OLT-CT 151-2 converts a downlink main signal and a downlink control signal destined for the ONU 320-4 into an optical signal of a wavelength $\lambda_{D\text{-}2}$ and outputs the optical signal to the wavelength multiplexing/demultiplexing unit 14.

The wavelength multiplexing/demultiplexing unit 14 outputs a wavelength-multiplexed signal obtained by multiplexing the downlink optical signals of the wavelengths $\lambda_{D\text{-}0}$, $\lambda_{D\text{-}1}$, and $\lambda_{D\text{-}2}$ output by the OLT 350, to the transmission line 32. The optical coupling/splitting unit 13 receives the wavelength-multiplexed signal from the transmission line 32, splits the received wavelength-multiplexed signal, and outputs the result to the corresponding transmission line among the transmission lines 31-1 to 31-N.

The optical transmission/reception unit 322 of the ONU 320-3 receives a control signal and a main signal of a wavelength $\lambda_{D\text{-}1}$ from the wavelength-multiplexed signal and converts the control signal and the main signal into an electrical signal. The optical transmission/reception unit 322 of the ONU 320-4 receives a control signal and a main signal of a wavelength $\lambda_{D\text{-}2}$ from the wavelength-multiplexed signal and converts the control signal and the main signal into an electrical signal. Each of the optical transmission/reception unit 123 of the ONUs 320-1, 320-2, and 320-5 to 320-N receives a control signal of a wavelength of $\lambda_{D\text{-}0}$ from the wavelength-multiplexed signal and converts the control signal into an electrical signal. The lower communication unit 121 of the ONU 320-3 outputs the main signal and the control signal of the radio system to the RU 11-3, and the lower communication unit 121 of the ONU 320-4 outputs the main signal and the control signal of the radio system to the RU 11-4. The lower communication unit 121 of the ONU 320-*j* excluding j=3, 4 outputs the control signal for the radio system to the RU 11*j*.

The signals transmitted and received in the optical access section between the ONUs 320-1 to 320-4 and the OLT 350 at each of the times T1, T2, and T3 are similar to the signals between the ONUs 12-1 to 12-4 and the OLT 15 illustrated in the left column of FIG. 2.

In the present embodiment, only during a period in which main signal communication is performed in the RU, a wavelength for main signal communication is exclusively assigned to the ONU connected to the RU. All ONUs excluding the ONU connected to the RU in which the main signal communication is performed transmit and receive the control signal using the wavelength $\lambda_0$. Thus, the number of OLT-CTs and the number of wavelengths used can be reduced to (n+1).

In the present embodiment, a wavelength-variable transceiver can be used for the ONU, and the ONU does not necessarily need to include a plurality of optical transceivers for transmission and reception of control signals and for transmission and reception of main signals. Therefore, capital investment costs can be reduced.

Since the exclusively assigned wavelength can be occupied and utilized by the assigned ONU, a high throughput can be achieved. Since a wait delay with another ONU does not occur, a main signal generated in the RU can be transmitted with a low delay.

Fourth Embodiment

In the fourth embodiment, the wavelength used by each ONU is fixed. In the fourth embodiment, a wavelength used for an ONU that performs main signal communication is changed. Hereinafter, differences from the third embodiment will be mainly described.

The configuration of the wavelength multiplexing communication system of the present embodiment is similar to that of the wavelength multiplexing communication system 3 of the third embodiment illustrated in FIG. 6. However, the wavelength assignment unit 351 of the OLT 350 exclusively and dynamically assigns a wavelength for main signal communication to the ONU 320 in which the main signal is generated. The wavelength to be assigned is changed, for example, when the set of ONUs 320 in which the main signal is generated changes, but may be changed at other timings.

Figure 8:
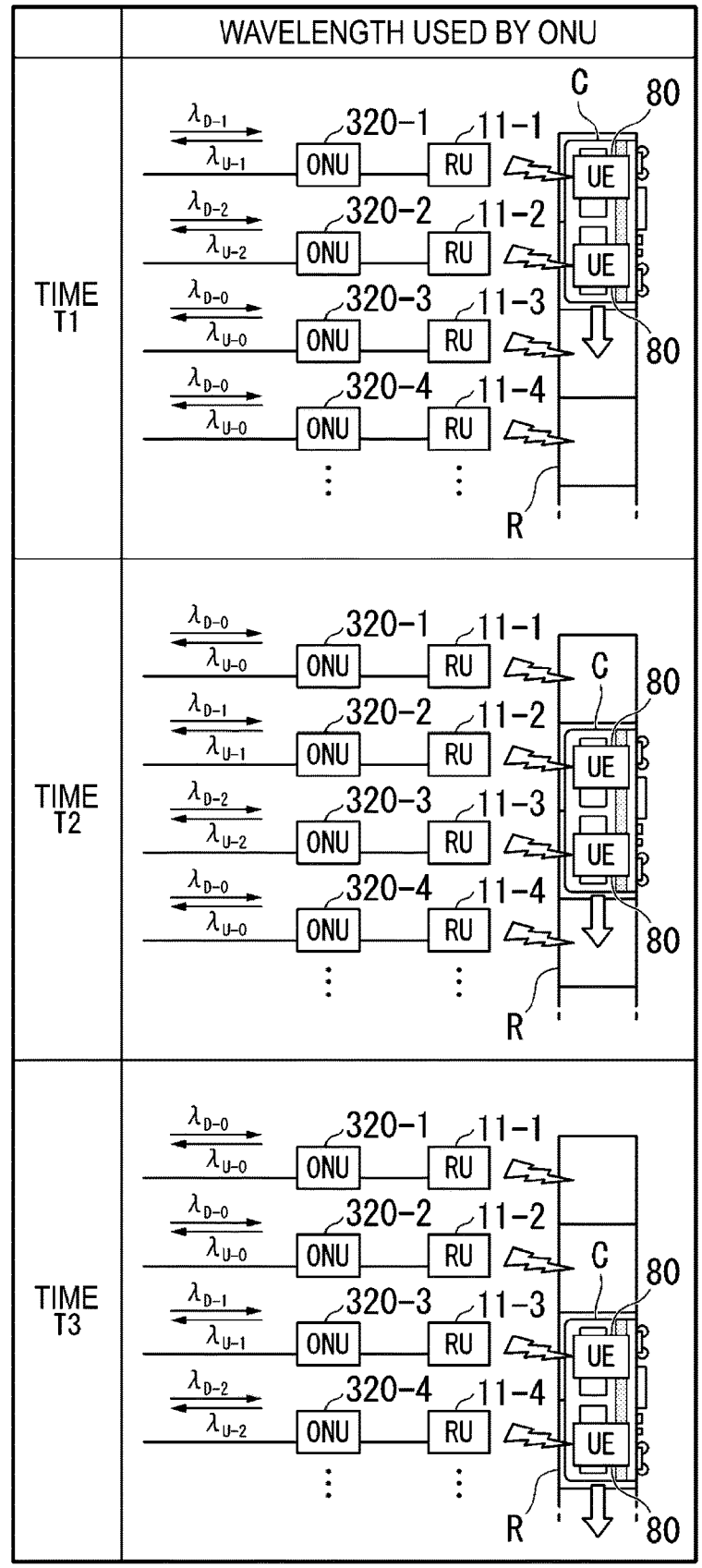
FIG. 8 is a diagram illustrating an exemplary configuration of a wavelength multiplexing communication system according to a fourth embodiment.
Figure 9:
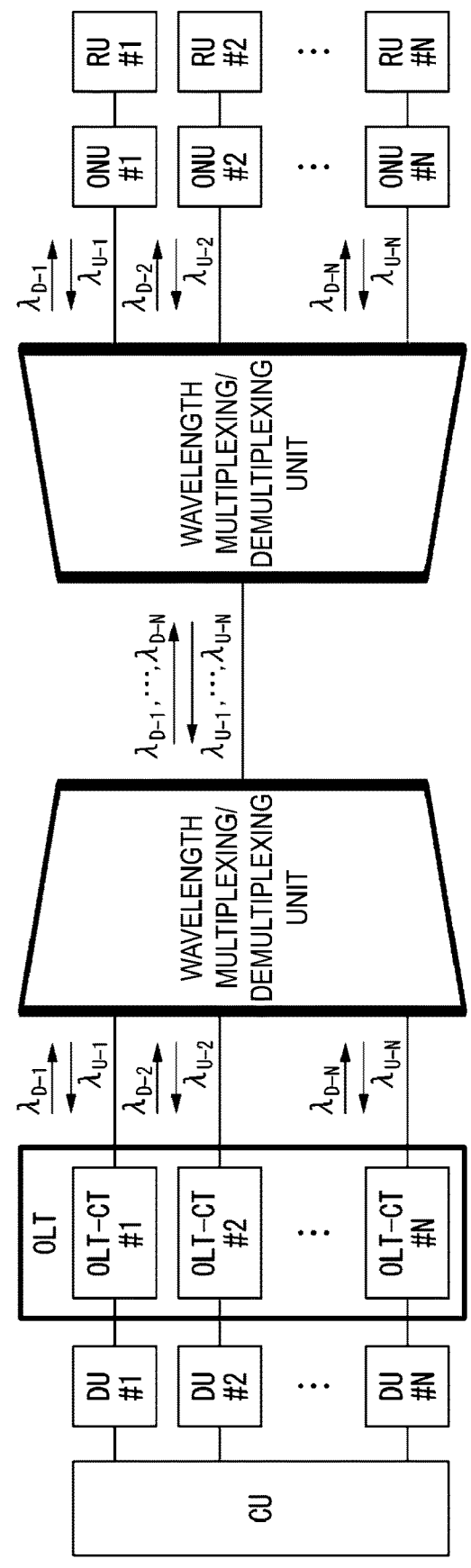
FIG. 9 is a diagram illustrating an exemplary configuration of a wavelength multiplexing communication system according to the related art.
Figure 10:
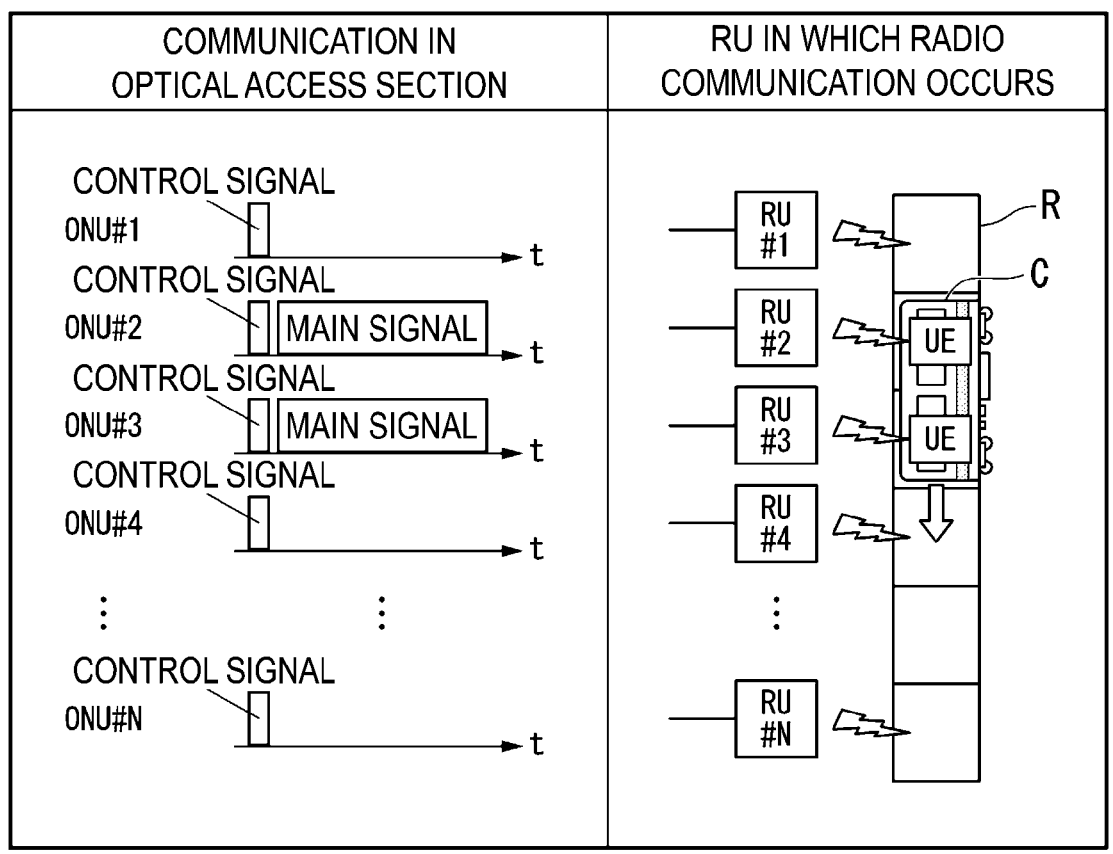
FIG. 10 is a diagram illustrating a use case of a moving body according to the related art.

FIG. 8 is a diagram illustrating a use case of a moving body of the wavelength multiplexing communication system 3 according to the present embodiment. FIG. 8 illustrates the RU 11 communicating with the UE 80 at each time and the wavelength used by the ONU 320. As similar to FIG. 2, the UEs 80 are provided in the train C moving at a high speed on the track R or present in the train C, and the RUs 11-1 to 11-N are installed along the track R. A case where there are two UEs 80 provided in the train C or present in the train C, and up to two RUs 11 (n=2) perform radio communication in the same period will be described as an example.

At time T1, each of the RUs 11-1 and 11-2 performs radio communication with the corresponding UE 80. The operation of the uplink communication and the downlink communication of the wavelength multiplexing communication system 3 at the time T1 is similar to that of the third embodiment.

At time T2, each of the RUs 11-2 and 11-3 performs radio communication with the corresponding UE 80. The wavelength assignment unit 351 of the OLT 350 transmits a control signal for assigning a wavelength $\lambda_1$ to the ONU 320-2, transmits a control signal for assigning a wavelength $\lambda_2$ to the ONU 320-3, and transmits a control signal for assigning a wavelength $\lambda_0$ to the ONUs 320-1 and 320-4 to 320-N. The wavelength assignment unit 351 outputs, to the transfer apparatus 360, information indicating that the main signal is generated in the RU 11-2 and the RU 11-3, and information indicating that the wavelength $\lambda_1$ is exclusively assigned to the ONU 320-2, and the wavelength $\lambda_2$ is exclusively assigned to the ONU 320-3. When receiving the control signal, the wavelength control unit 323 of the ONU 320-2 controls the optical communication unit 321 to transmit and receive the optical signal with the wavelength $\lambda_1$. When receiving the control signal, the wavelength control unit 323 of the ONU 320-3 controls the optical communication unit 321 to transmit and receive the optical signal with the wavelength $\lambda_2$. When receiving the control signal, the wavelength control unit 323 of each of the ONUs 320-1 and 320-4 to 320-N controls the optical communication unit 321 to transmit and receive the optical signal with the wavelength $\lambda_0$.

The uplink communication at the time T2 will be described. The operation of the RUs 11-1 to 11-N is similar to that of the wavelength multiplexing communication system 3 of the third embodiment. The optical transmission/reception unit 322 of the ONU 320-2 converts the uplink control signal of the optical access system and the uplink control signal and the uplink main signal of the radio system received by the lower communication unit 121 from the RU 11-2 into an optical signal of a wavelength $\lambda_{U-1}$, and outputs the optical signal to the transmission line 31-2. The optical transmission/reception unit 322 of the ONU 320-3 converts the uplink control signal of the optical access system and the uplink control signal and the uplink main signal of the radio system received by the lower communication unit 121 from the RU 11-3 into an optical signal of a wavelength $\lambda_{U-2}$, and outputs the optical signal to the transmission line 31-3. The optical transmission/reception unit 322 of the ONU 320-$j$ excluding j=2, 3 converts the uplink control signal of the optical access system and the uplink control signal of the radio system received by the lower communication unit 121 from the RU 11$j$ into an optical signal of a wavelength $\lambda_{U-0}$, and outputs the optical signal to the transmission line 31$j$.

The operation from when the optical coupling/splitting unit 13 outputs the wavelength-multiplexed signal obtained by multiplexing the upstream optical signals of the wavelengths $\lambda_{U-0}$ to $\lambda_{U-2}$ to the transmission line 32 to when the OLT-CTs 151-0, 151-1, and 151-2 convert the input optical signals into electrical signals and output the electrical signals to the transfer apparatus 360 is similar to that at the time T1.

The transfer apparatus 360 transfers the control signal received from the OLT-CT 151-0 similarly to the third embodiment. The transfer apparatus 360 receives the main signal and the control signal from the OLT-CT 151-1 and transfers these signals to the DU 17-2 that is the destination. The transfer apparatus 360 receives the main signal and the control signal from the OLT-CT 151-2 and transfers these signals to the DU 17-1 that is the destination. The DUs 17-1 and 17-2 output the main signals to the CU 18.

Next, downlink communication at the time T2 will be described. The CU 18 outputs a downlink main signal destined for the RU 11-2 to the DU 17-2, and outputs a downlink main signal destined for the RU 11-3 to the DU 17-1. The DU 17-2 outputs the main signal and the control signal destined for the RU 11-2 to the transfer apparatus 360, and the DU 17-1 outputs the main signal and the control signal destined for the RU 11-3 to the transfer apparatus 360. The DU 17-($j$ mod(n)) (however, when j is a multiple of n, DU 17-$n$) excluding j=2, 3 outputs the control signal addressed to the RU 11$j$ to the transfer apparatus 360.

The transfer apparatus 360 receives a main signal and a control signal destined for the RU 11-2 from the DU 17-2. Since a main signal is generated in the RU 11-2 and a wavelength $\lambda_1$ is exclusively assigned to the ONU 320-2, the transfer apparatus 360 transfers the main signal and the control signal destined for the RU 11-2 to the OLT-CT 151-1 corresponding to the wavelength $\lambda_1$. As similar to this, the transfer apparatus 360 receives a main signal and a control signal destined for the RU 11-3 from the DU 17-1. Since a main signal is generated in the RU 11-3 and a wavelength $\lambda_2$ is exclusively assigned to the ONU 320-3, the transfer apparatus 360 transfers the main signal and the control signal destined for the RU 11-3 to the OLT-CT 151-2 corresponding to the wavelength $\lambda_2$. The transfer apparatus 360 receives the control signal destined for the RU 11$j$ excluding j=2, 3 from the DU 17-($j$ mod(n)) (however, j is a multiple of n, DU 17-$n$) and transfers the control signal to the OLT-CT 151-0, similarly to the third embodiment.

The OLT-CT 151-0 converts the downlink control signal destined for each of the ONUs 320-1 and 320-4 to 320-N into an optical signal of a wavelength of $\lambda_{D-0}$, and outputs the optical signal to the wavelength multiplexing/demultiplexing unit 14. The OLT-CT 151-1 converts the downlink main signal and the downlink control signal destined for the ONU 320-2 into an optical signal of a wavelength $\lambda_{D-1}$ and outputs the optical signal to the wavelength multiplexing/demultiplexing unit 14, and the OLT-CT 151-2 converts a downlink main signal and a downlink control signal destined for the ONU 320-3 into an optical signal of a wavelength $\lambda_{D-2}$ and outputs the optical signal to the wavelength multiplexing/demultiplexing unit 14.

The wavelength multiplexing/demultiplexing unit 14 outputs a wavelength-multiplexed signal obtained by multiplexing the downlink optical signals of the wavelengths $\lambda_{D-0}$, $\lambda_{D-1}$, and $\lambda_{D-2}$ output by the OLT 350, to the transmission line 32. The optical coupling/splitting unit 13 receives the wavelength-multiplexed signal from the transmission line 32, splits the received wavelength-multiplexed signal, and outputs the result to the corresponding transmission line among the transmission lines 31-1 to 31-N.

The optical transmission/reception unit 322 of the ONU 320-2 receives a control signal and a main signal of a wavelength $\lambda_{D-1}$ from the wavelength-multiplexed signal and converts the control signal and the main signal into an electrical signal. The optical transmission/reception unit 322 of the ONU 320-3 receives a control signal and a main signal of a wavelength $\lambda_{D-2}$ from the wavelength-multiplexed signal and converts the control signal and the main signal into an electrical signal. The optical transmission/reception unit 123 of each of the ONUs 320-1 and 320-4 to 320-N receives a control signal of a wavelength of $\lambda_{D-0}$ from the wavelength-multiplexed signal and converts the control signal into an electrical signal. Subsequent operation is similar to that of the third embodiment.

At time T3, each of the RUs 11-3 and 11-4 performs radio communication with the corresponding UE 80. The operation of the wavelength multiplexing communication system 3 at the time T3 is similar to that of the third embodiment.

The signals transmitted and received in the optical access section between the ONUs 320-1 to 320-4 and the OLT 350 at each of the times T1, T2, and T3 are similar to the signals between the ONUs 12-1 to 12-4 and the OLT 15 illustrated in the left column of FIG. 2.

According to the embodiments described above, the wavelength multiplexing communication system includes a master station apparatus and a plurality of slave station apparatuses. The master station apparatus is, for example, the OLT 15, 250, or 350. The slave station apparatus is, for example, the ONU 12, 220, or 330. The master station apparatus includes a wavelength multiplexing communication unit. The wavelength multiplexing communication unit is, for example, the OLT-CT 151-0 to 151-N. The wavelength multiplexing communication unit performs wavelength multiplexing communication with the plurality of slave station apparatuses by wavelengths the number of which is equal to or less than the number of the plurality of slave station apparatuses, using an optical signal of one or more wavelengths included in a first wavelength group and an optical signal having one or more wavelengths included in a second wavelength group. For example, the wavelength in the first wavelength group is the wavelength for the main signal communication, and the wavelength in the second wavelength group is the wavelength for the control signal communication. The slave station apparatus includes an optical communication unit. When the main signal communication is performed in the host slave station apparatus, the optical communication unit performs communication of the main signal with the master station apparatus by an optical signal of a wavelength in the first wavelength group, which is different from a wavelength in the first wavelength group used by another slave station. When the main signal communication is not performed in the host slave station apparatus, the optical communication unit performs communication of a signal other than the main signal with the master station apparatus by an optical signal of a wavelength in the second wavelength group, which is a wavelength same as a wavelength used by another slave station apparatus. Therefore, the number of wavelengths used between the master station apparatus and the slave station apparatuses is equal to or less than the total of the number of slave station apparatuses that perform communication of the main signal at the same time and the number of wavelengths in the second wavelength group.

When the main signal communication is performed in the host slave station apparatus, the optical communication unit performs communication of the main signal with the master station apparatus by an optical signal of a wavelength in the first wavelength group, which is different from a wavelength in the first wavelength group used by another slave station, and performs communication of a signal other than the main signal with the master station apparatus by an optical signal of a wavelength in the second wavelength group, which is a wavelength same as a wavelength used by another slave station apparatus. The wavelength within the second wavelength group may be fixed and assigned to each slave station apparatus.

When the main signal communication is performed in the host slave station apparatus, the optical communication unit may perform communication of the main signal and communication of a signal other than the main signal with the master station apparatus by an optical signal of a wavelength in the first wavelength group, which is different from a wavelength in the first wavelength group used by another slave station.

The wavelength multiplexing communication system may further include a wavelength assignment unit that assigns different wavelengths included in the first wavelength group to each of the plurality of slave station apparatuses in which the main signal is generated. The wavelength assignment unit may dynamically assign a different wavelength included in the first wavelength group to each of the plurality of slave station apparatuses in which the main signal is generated.

The wavelength multiplexing communication unit may include a plurality of optical signal terminations that terminate optical signals of different wavelengths. An example of the optical signal terminations includes OLT-CT 151. The number of optical signal terminations included in the wavelength multiplexing communication unit is the total of the maximum value of the number of the slave station apparatuses that perform communication of the main signal at the same time and the number of wavelengths in the second wavelength group.

Although embodiments of the present invention have been described above in detail with reference to the drawings, the specific configurations thereof are not limited to those of the embodiments and also include designs or the like without departing from the spirit of the present invention.

REFERENCE SIGNS LIST 1, 1a, 2, 3 Wavelength multiplexing communication system
11-1 to 11-2n RU
12-1 to 12-2n, 220-1 to 220-2n, 320-1 to 320-2n ONU
13 Optical coupling/splitting unit
14 Wavelength multiplexing/demultiplexing unit
15, 250, 350 OLT
16, 360 Transfer apparatus
17-1 to 17-n DU
18 CU
31-1 to 31-2n, 32, 34, 36 Transmission line
35 Optical coupling/splitting unit
80 UE
121 Lower communication unit
122, 321 Optical communication unit
123, 124, 322 Optical transmission/reception unit
151-0 to 151-n OLT-CT
221, 323 Wavelength control unit
251, 351 Wavelength assignment unit

The invention claimed is:
1. A wavelength multiplexing communication system comprising:
  a master station apparatus; and
  a plurality of slave station apparatuses,
  wherein the master station apparatus includes a wavelength multiplexing communication unit configured to perform wavelength multiplexing communication with the plurality of slave station apparatuses by using an optical signal,
  wherein a first subset of slave station apparatuses perform communication of a main signal communication with the master station apparatus using an optical signal during a first time period, such that the wavelength of the optical signal is different for each slave station apparatus in the first subset of slave station apparatuses, and number of slave station apparatus in the first subset of slave station apparatuses is less than number of slave station apparatuses in the plurality of slave station apparatuses;
  wherein a second subset of slave station apparatuses perform communication of a main signal communication with the master station apparatus using an optical signal during a second time period, such that the wavelength of the optical signal is different for each slave station apparatus in the second subset of slave station apparatuses, wavelengths assigned to the second subset of slave station apparatuses for main signal communication are same wavelengths assigned to the first subset of slave station apparatuses for main signal communication, and the slave station apparatuses in the first subset of slave station apparatuses differ from the slave station apparatuses in the second subset of slave station apparatuses;
  wherein each of the slave station apparatuses performs communication of a signal other than the main signal communication with the master station apparatus using an optical signal such that wavelength of the optical signal is same for each of the slave station apparatuses.

* * * * *